US010343290B2

(12) United States Patent
Claretti et al.

(10) Patent No.: US 10,343,290 B2
(45) Date of Patent: Jul. 9, 2019

(54) CONFORMABLE VARIABLE FRICTION MANIPULATOR

(71) Applicant: Amazon Technologies, Inc., Seattle, WA (US)

(72) Inventors: Ennio Claretti, Somerville, MA (US); Andrew D. Marchese, Concord, MA (US); Ying Xu, Medford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/452,956

(22) Filed: Mar. 8, 2017

(65) Prior Publication Data

US 2018/0257241 A1 Sep. 13, 2018

(51) Int. Cl.
*B25J 15/00* (2006.01)
*B25J 15/02* (2006.01)
*B25J 15/06* (2006.01)

(52) U.S. Cl.
CPC ........... *B25J 15/0023* (2013.01); *B25J 15/00* (2013.01); *B25J 15/0028* (2013.01); *B25J 15/02* (2013.01); *B25J 15/0616* (2013.01)

(58) Field of Classification Search
CPC .. B25J 15/026; B25J 15/0023; B25J 15/0009; B25J 15/0253; B25J 19/021; B25J 15/00; B25J 15/02; B25J 15/0616; B25J 15/0028; B66C 1/46
USPC ...................................................... 294/119.3
See application file for complete search history.

(56) References Cited

U.S. PATENT DOCUMENTS

| | | | |
|---|---|---|---|
| 5,250,074 A * | 10/1993 | Wilk | A61B 17/12 606/158 |
| 5,364,146 A | 11/1994 | Brandorff et al. | |
| 5,403,056 A | 4/1995 | Wallace | |
| 6,484,601 B1 * | 11/2002 | Arrichiello | B25J 9/14 294/106 |

(Continued)

FOREIGN PATENT DOCUMENTS

| EP | 2669065 A1 | 12/2013 |
|---|---|---|
| WO | WO2015069105 A1 | 5/2015 |
| WO | WO2016172670 A1 | 10/2016 |

OTHER PUBLICATIONS

The PCT Search Report and Written Opinion dated Jul. 11, 2018, for PCT Application No. PCT/US18/21067, 13 pages.

*Primary Examiner* — Stephen A Vu
(74) *Attorney, Agent, or Firm* — Lee & Hayes, P.C.

(57) ABSTRACT

A system, apparatus, and method is configured to retrieve items and particularly items that are stored in high-density storage solutions. The system can include one or two-piece manipulators with retractable grippers. The manipulators can be relatively low profile and/or low friction to facilitate their placement between a target item and adjacent items on densely packed shelves or trays. In a retracted position, the grippers can be stowed beneath the surface of the manipulators to further facilitate the placement of the manipulators. In a deployed position, the grippers can extend above the surface of the manipulators to increase the contact area, coefficient of friction, and/or surface pressure of the manipulators on the target item. The grippers can enable the manipulators to be thinner than would otherwise be possible to enable retrieval of items from tightly packed storage solutions—e.g., warehouses with higher gross cubic utilization (GCU).

20 Claims, 21 Drawing Sheets

(56) References Cited

U.S. PATENT DOCUMENTS

| | | | |
|---|---|---|---|
| 2006/0033350 A1 | 2/2006 | Besch | |
| 2011/0276082 A1* | 11/2011 | Fehring | A61H 1/0285 606/204 |
| 2013/0033050 A1* | 2/2013 | Matsuoka | B25J 15/0023 294/86.4 |
| 2013/0140839 A1* | 6/2013 | Quinn | B66C 1/44 294/207 |
| 2013/0200644 A1* | 8/2013 | Shiomi | B25J 15/00 294/207 |

* cited by examiner

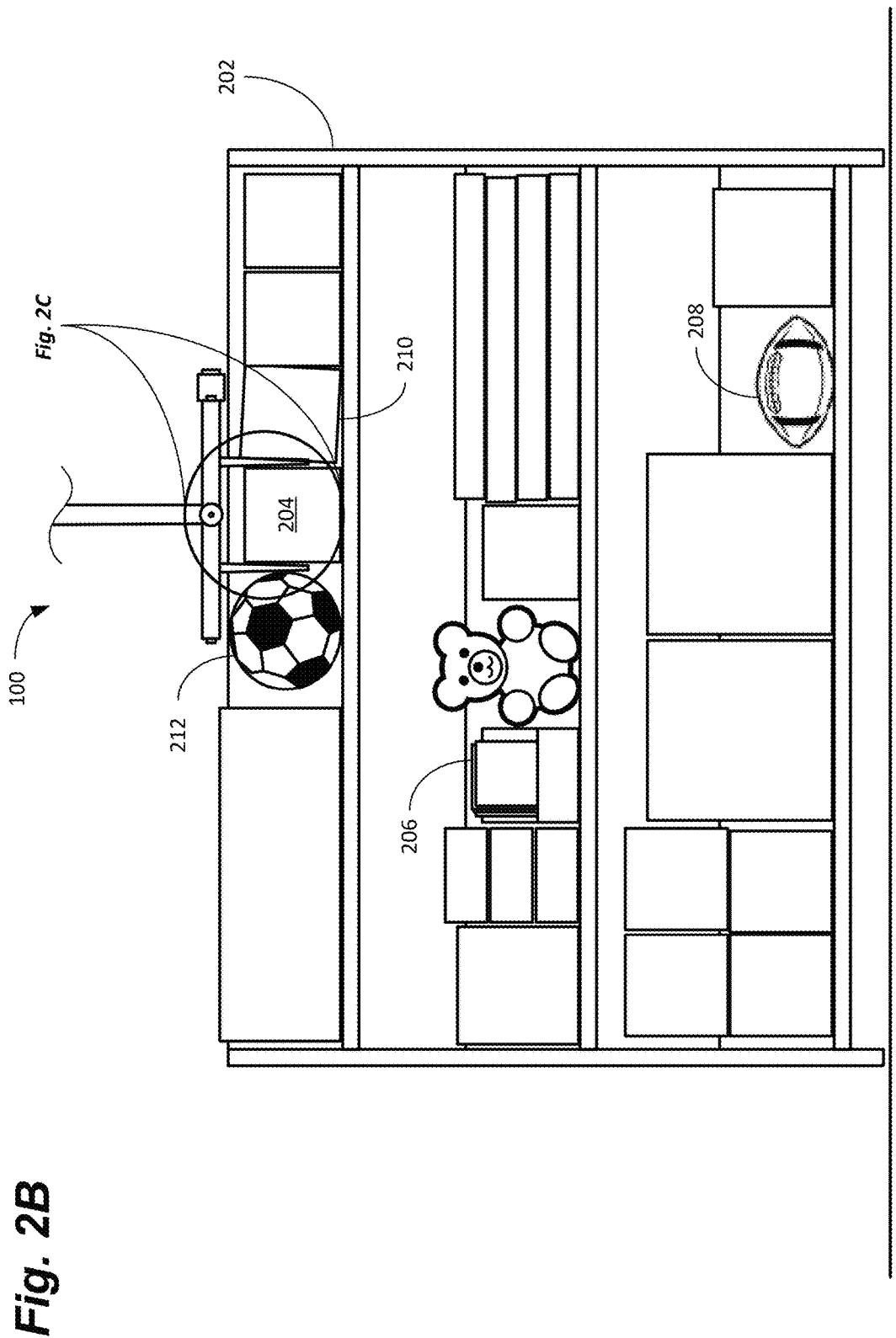

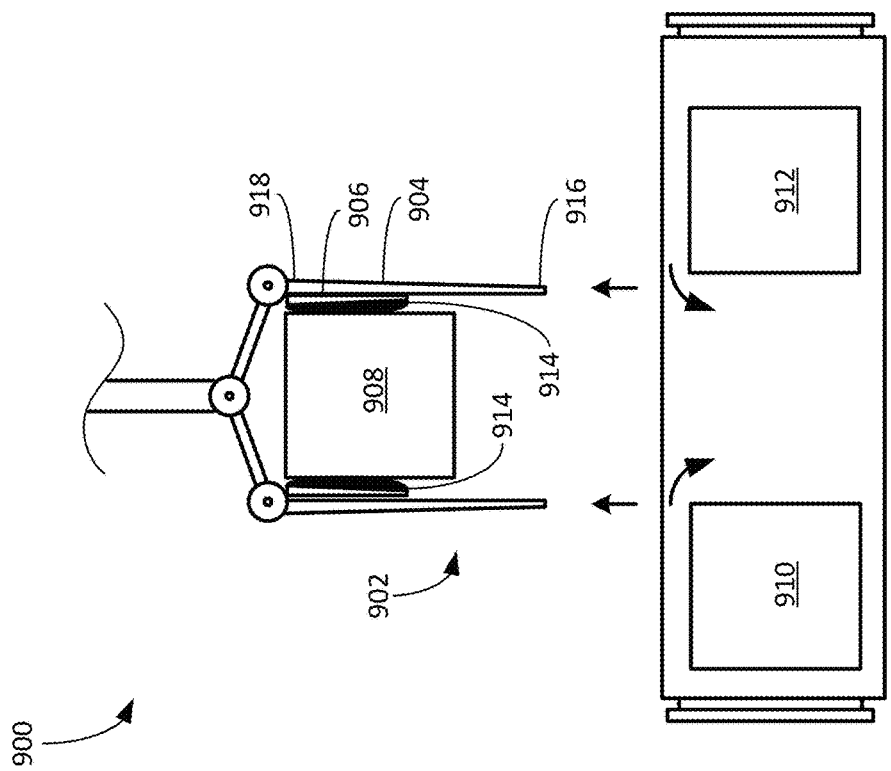
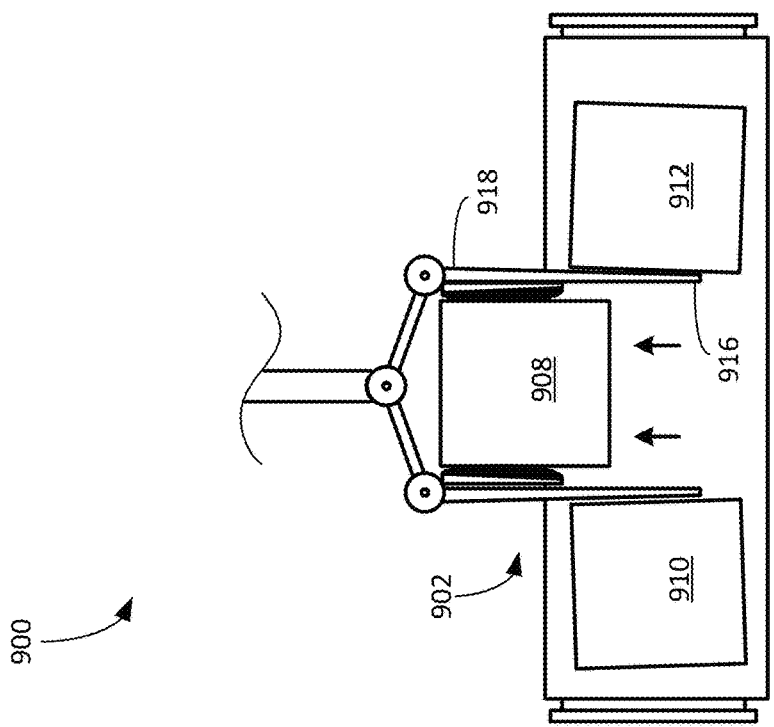

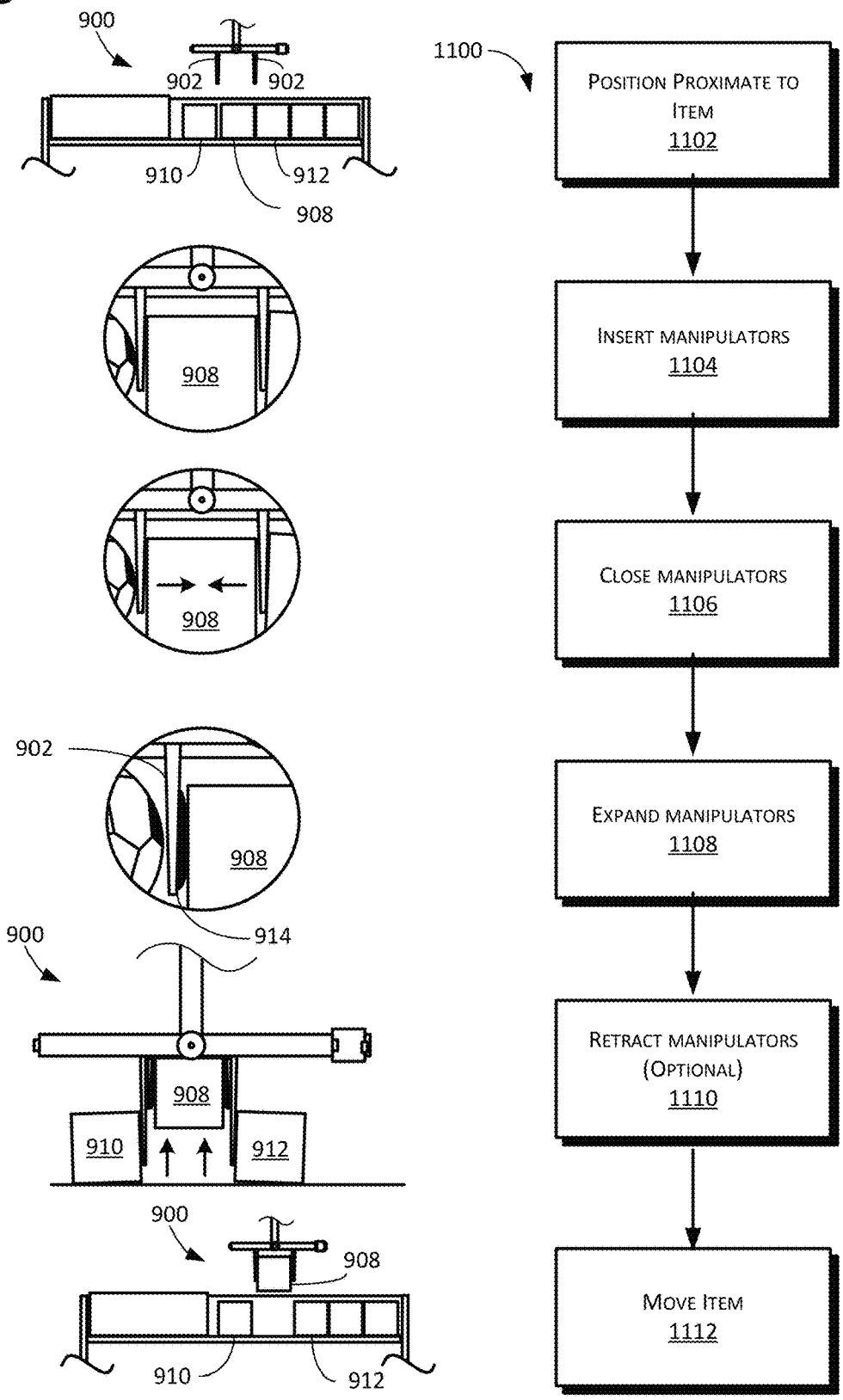

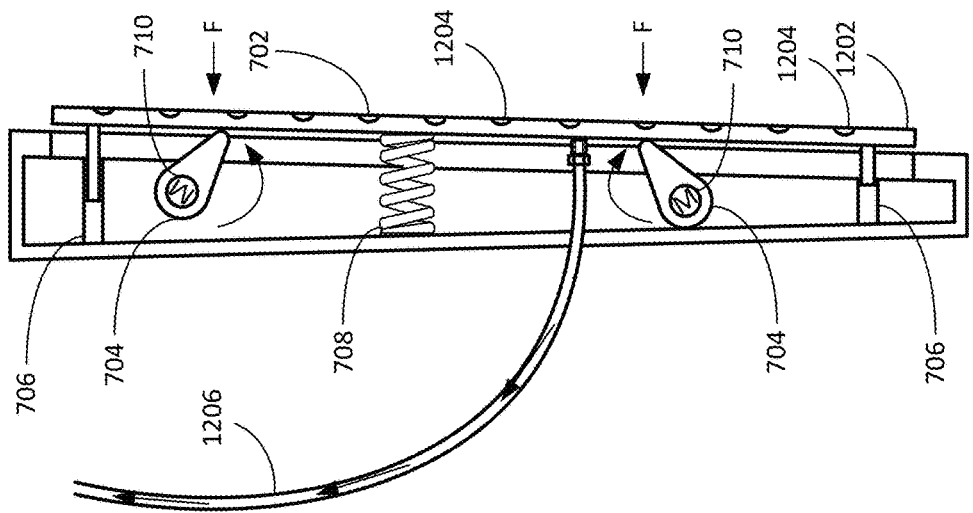
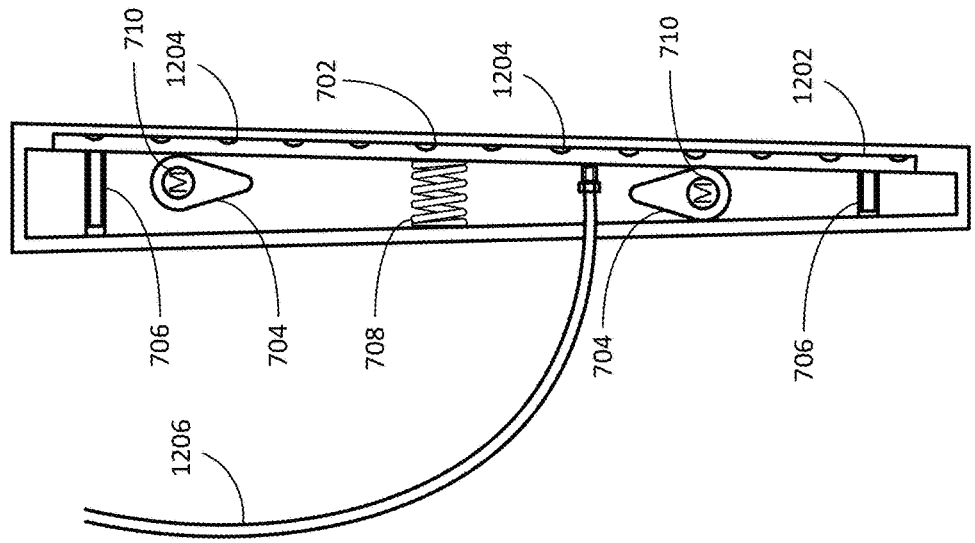

CONFORMABLE VARIABLE FRICTION MANIPULATOR

BACKGROUND

Home delivery for many products is available in a wide variety of locations. The proliferation of the internet and online retailers, for example, means that users can order everything from televisions to groceries online (or on the phone). In many cases, these items can be delivered within a day or two, or sometimes even within a couple of hours. To this end, it can be helpful to have the above-mentioned merchandise located in local warehouses. In a large city, for example, a large online retailer may have multiple warehouses in different locations in the same city to minimize delivery time and costs.

The efficiency of any warehouse, however, is based in part on the efficiency with which the space in the warehouse is utilized, sometime quantified as gross cubic utilization (GCU). GCU can be expressed as a fraction, or percentage, of the total volume of storage space in the warehouse over the total volume of the warehouse itself. Thus, warehouses with a high percentage of shelving space to floor space and those with densely packed shelves, for example, will have a higher GCU than less densely packed warehouses.

It can be difficult, however, to remove items from tightly packed storage solutions or oddly shaped items using conventional robotics technology. Accurate placement of robotic arms to pick densely packed items, for example, is one challenge. In addition, the goal of making robotic arms with manipulators thin enough to fit between densely packed items is at odds with the goal of making the manipulators strong enough to pick up items of any significant weight. Thus, human workers are often relegated to manually pick densely packed or oddly shaped items, which can increase costs.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 2A-2D depict a front view of the variable friction manipulator system of FIGS. 1A and 1B being used to vertically retrieve an item from a shelving unit, in accordance with some examples of the present disclosure.

FIGS. 9A-9D depict a front view of a variable friction manipulator system with inner and outer manipulators horizontally retrieving an item from a shelving unit, in accordance with some examples of the present disclosure.

FIG. 11 is a pictorial flow diagram depicting a method of using the variable friction manipulator system to remove an item from a shelving unit, in accordance with some examples of the present disclosure.

FIGS. 12A and 12B depict a cross-sectional view of the variable friction manipulator with one or more eccentrics of FIGS. 7A and 7B with vacuum assist in a retracted position (FIG. 12A) and a deployed position (FIG. 12B), in accordance with some examples of the present disclosure.

DETAILED DESCRIPTION

Figure 1A:
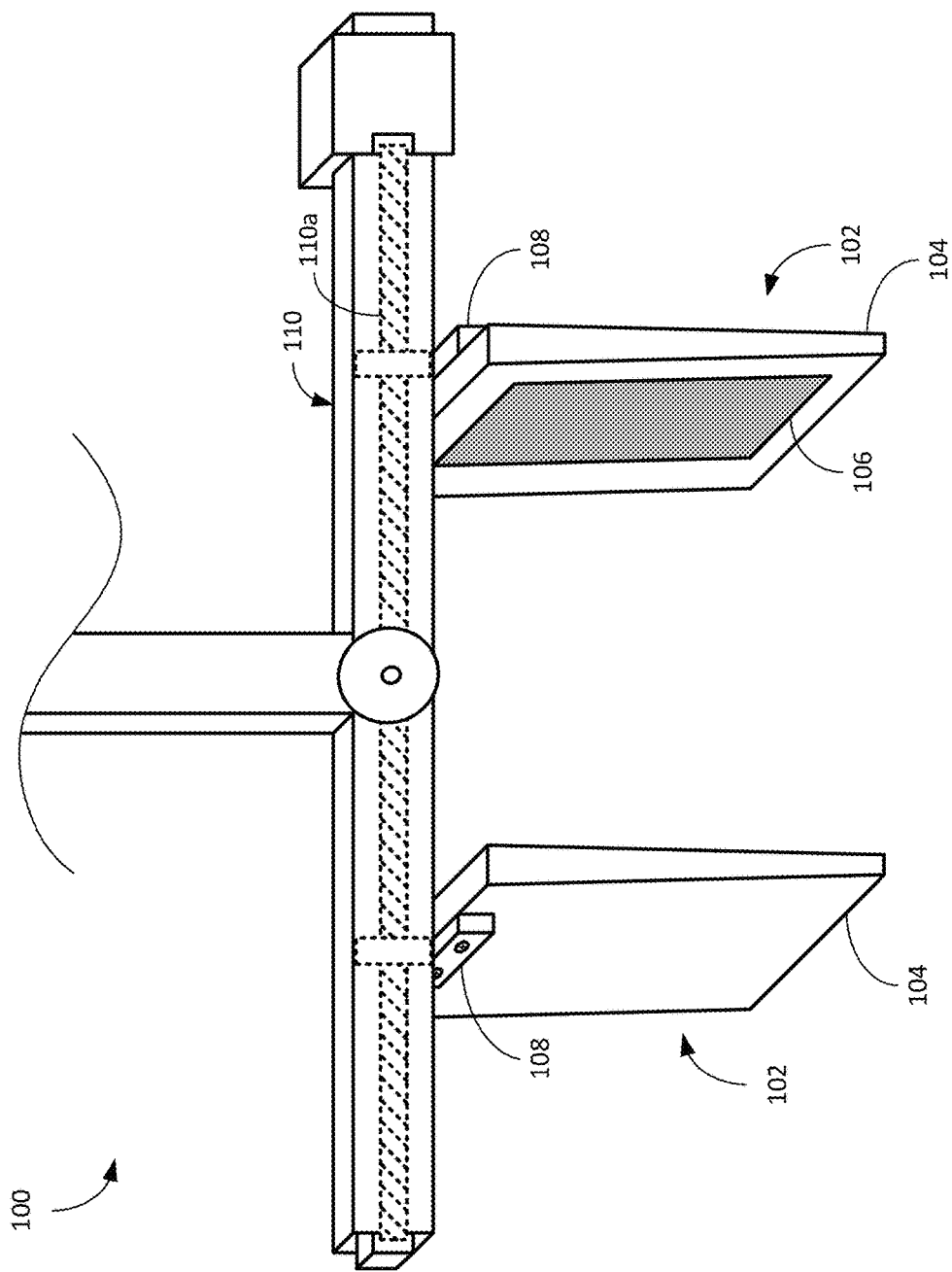
FIG. 1A depicts a front, perspective view of a variable friction manipulator system in a retracted position, in accordance with some examples of the present disclosure.

Examples of the present disclosure are related to systems, apparatuses, and methods for picking items reliably from shelving units, and particularly picking items from densely pack shelving units in a warehouse, or other, environment. The system can include a variety of robotic arms, forklifts, or other lifting machine configurations that include variable friction fingers, mechanical arms, graspers, forks, or other item movement mechanisms (collectively, "manipulators"). The system can provide manipulators that have low friction surface(s) and/or are low profile in a first direction and a higher friction and/or higher profile in a second direction. In this manner, the manipulators can be easily inserted between items on a densely packed shelf, for example, but then remove the target item with little or no effect on surrounding items on the shelf. Thus, the manipulators can be easily inserted between items on a shelf, expanded or deployed, and then used to lift the item off the shelf with little or no disturbance to surrounding items.

The systems, apparatuses, and methods described herein are described in terms of a manipulator for a robotic arm in a warehouse environment. One of skill in the art will realize, however, that the disclosure is not so limited. The system can be used any time mechanisms need to be used to pick and place items. Thus, while disclosed below with reference to an inventory robot in a warehouse, for example, the system is equally applicable for use with forklifts, cranes, and other lifting equipment, regardless of whether the equipment is autonomous, semi-autonomous, or manually operated. Thus, in this regard, the disclosure is intended to be purely illustrative and not limiting.

As mentioned above, the efficiency of a warehouse, and the costs associated therewith, is based at least in part on the gross cubic utilization (GCU) of the warehouse. Thus, a warehouse that is densely packed with shelving units has a higher (i.e., more efficient) GCU than a warehouse with more open floor space. Similarly, a warehouse with densely packed shelves has a higher GCU than one with more sparsely packed shelves.

In a warehouse with a very dense floorplan, however, navigating forklifts, warehouse robots, and other machinery around the shelving units, workers, and other obstacles can be challenging. Similarly, removing items from densely packed shelves using a forklift, robotic picker, or even a worker is more difficult than removing items from a less densely packed shelf. On a very densely packed shelf, for example, simply inserting a mechanism between the target object and adjacent objects may knock items over, knock items off the shelf, or damage items among other undesirable outcomes.

When using an inventory robot, therefore, it may be advantageous to have very thin "manipulators" at the end of an articulating arm, for example, such that the manipulators easily slide in between the items on the shelf. The manipulators can also be made at least partly from a relatively smooth, low friction surface such as, for example, aluminum, carbon fiber, or other plastic. Due to their relatively low profile, however, thin manipulators—that also may have a low coefficient of friction, for example—may not have sufficient rigidity to pick up certain items. In other words, the compressive force required to generate sufficient friction to pick the item up cannot be achieved due to the flexibility of the manipulators. In addition, many items in a warehouse may be fragile, flexible, or poorly packaged, such that the compressive force necessary to pick up the item with a smooth manipulator would damage the item or the packaging.

Figure 1B:
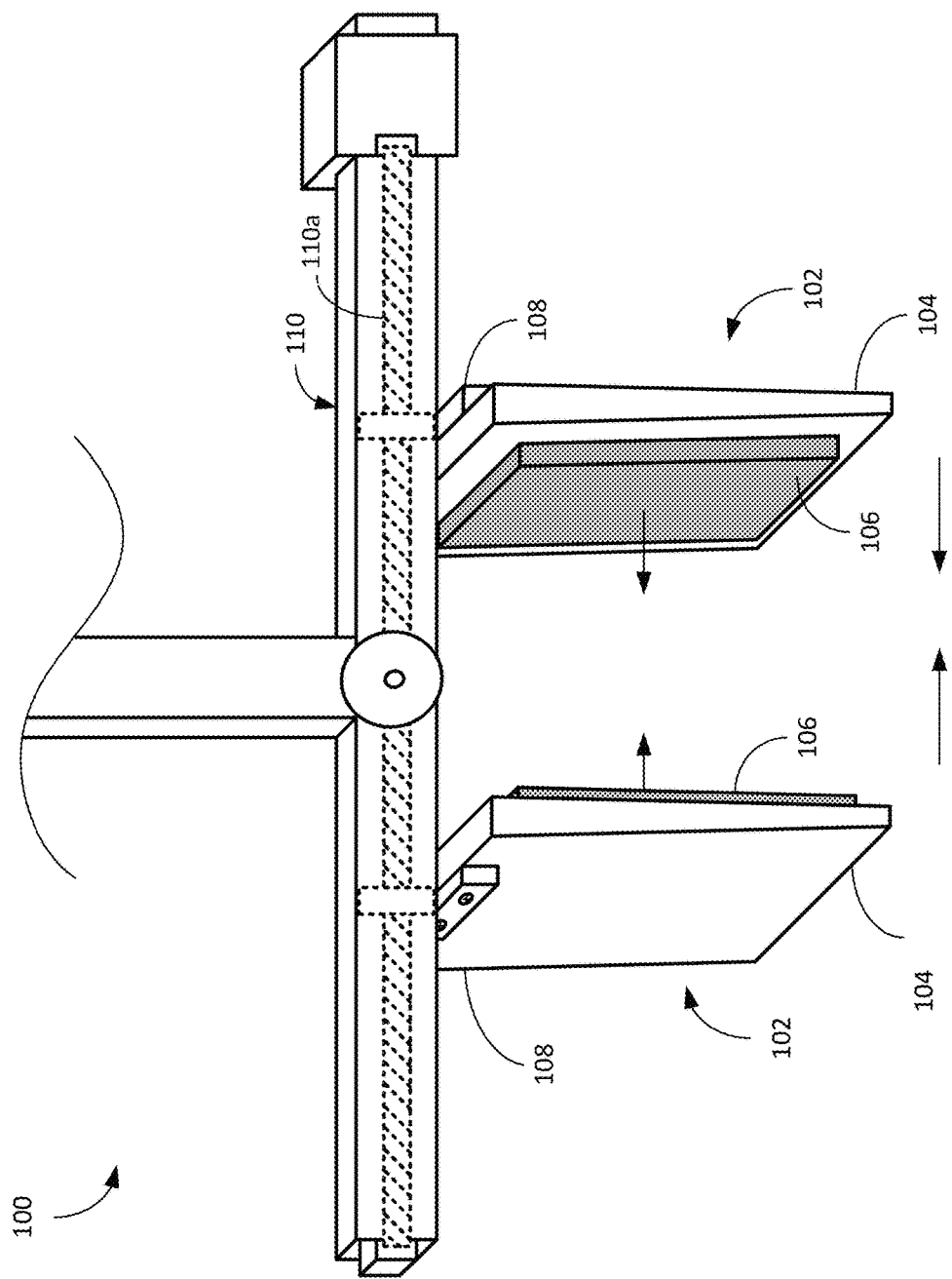
FIG. 1B depicts a front, perspective view of the variable friction manipulator system of FIG. 1A in a deployed position, in accordance with some examples of the present disclosure.

To this end, as shown in FIGS. 1A and 1B, examples of the present disclosure can comprise a system 100 comprising manipulators, or "manipulators" 102 configured to selectively grasp an item or collection of items. As shown, the manipulators 102 can have a retracted position (FIG. 1A), which is a low profile and/or low friction configuration; and, a deployed configuration (FIG. 1B), which is a comparatively high profile and/or high friction configuration. In this manner, the manipulator 102 can easily slide between tightly packed items in a first direction (e.g., down or in), yet provide sufficient friction to lift the item in a second direction (e.g., up or out).

As shown, each manipulator 102 can comprise a main body 104 and a gripper 106, which may deploy from or move relative to the main body in some embodiments. In some examples, the main body 104 can be mounted on a block 108, pivot, or other device, in communication with an actuator 110. In this case, the block 108 is mounted on a screw-drive actuator 110. Thus, when the screw 110a is turned in a first direction, the manipulators 102 get closer together and when the screw 110a is turned in a second direction, the manipulators 102 get farther apart. Of course, the manipulators 102 can also be mounted on linear actuators, servomotors, hydraulic, pneumatic, or electric motors, or form part of a robot arm or forklift, among other things. In other words, the actuation of the manipulators 102 is somewhat immaterial; the manipulators 102 themselves provide additional functionality.

Thus, regardless of the actual mechanism used, the manipulators 102 can be positioned around an item to be picked, the grippers 106 extended, and the item picked up. In this manner, as shown in FIG. 1A, in the retracted position, the system 100 can be relatively low profile and/or low friction to enable the manipulators 102 to easily slide between densely packed boxes with little or no disturbance to adjacent items. As shown in FIG. 1B, the grippers 106 can then be exposed, or moved into the extended or deployed position, to provide additional grip on the item. In some examples, in the retracted position (FIG. 1A), the grippers 106 can be disposed substantially, or entirely, below the surface of the main body 104, such that the low friction surface of the main body 104 can slide between the items. Once in place, the grippers 106 can then be deployed such that they protrude above the surface of the main body 104 to provide additional grip. In some examples, the grippers 106 can include a high-friction surface, an anisotropic material, vacuum, or other grip increasing features.

Figure 2A:
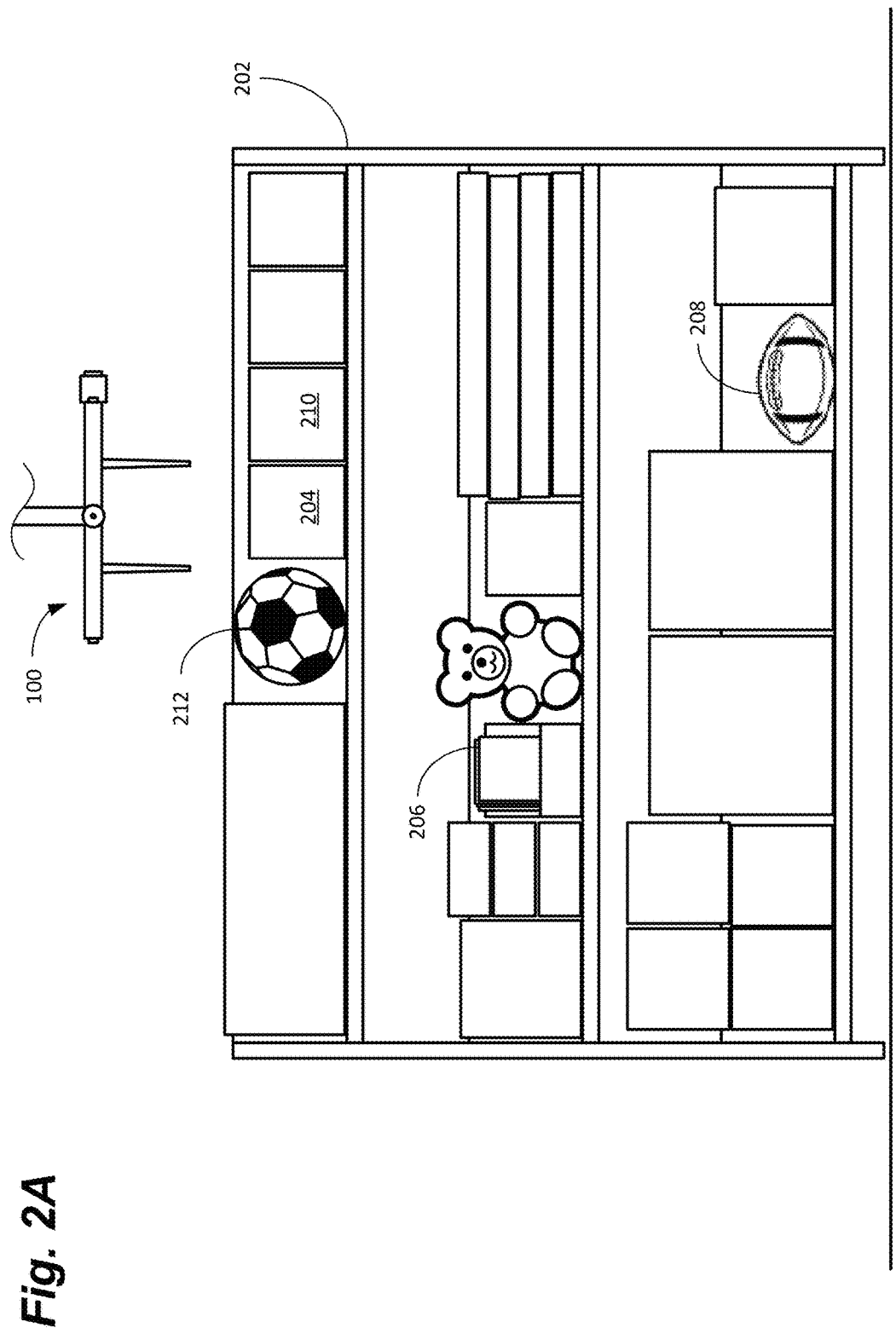

FIG. 2A depicts a shelving unit 202 comprising a number of relatively densely packed items. As shown, the items can be a variety of sizes and shapes and can be boxed 204, carded 206, or unpackaged 208. To initiate the process, therefore, the system 100 can be positioned near (e.g., over or in front of) the target item 204 to be picked and the manipulators 102 can be adjusted to approximately the relevant dimension (e.g., height, width, or depth) of the target item 204. In some examples, the manipulators 102 can be positioned so that they are slightly wider than the item. In other examples, the manipulators 102 can be positioned at approximately the same width as the item and then be allowed to "bump" open on the edges of the item.

As mentioned above the system 100 can comprise a robotic arm, a crane, or other mechanism suitable for retrieving items from the shelving unit 202. For placement, the robotic arms can include, for example, cameras, lasers, pressure transducers, and/or other sensors to locate the target item 204 and position the system 100 appropriately. In some examples, the system 100 can include a laser scanner, for example, to locate the item using a bar code. The system 100 can then use video or still cameras and machine vision, for example, to locate the edges of the target item 204 and/or the adjacent items 210, 212. Placing the manipulators 102 precisely between the target item 204 and the adjacent items 210, 212 may prevent damage to the items 204, 210, 212 and/or reduce the incidence of items 204, 210, 212 being knocked off the shelf or otherwise disturbed.

As shown in FIG. 2B, the system 100 can then be moved into position with the manipulators 102 on either side of the target item 204 and between the target item 2014 and adjacent items 210, 212. Because the manipulators 102 are relatively narrow, their placement between the target item 204 and the adjacent items 210, 212 can be achieved with little or no disturbance to the adjacent items 210, 212. Even on densely packed shelving units 202, an adjacent item 210 may not move at all or, as shown, may tip slightly to make room for the manipulators 102.

To enable the manipulators 102 to be easily inserted, they can be made relatively thin and can comprise a relatively low friction material such as, for example, aluminum with a smooth surface finish. Given their slim profile and low friction surface, however, the manipulators 102 may not be rigid enough to pick up the target item 204 in the conventional manner—i.e., using compression induced friction between the manipulators 102 and the target item 204. In other words, the slim manipulators 102 may simply be too flexible to generate the necessary friction. In addition, the target item 204 may also be smooth or slippery, irregularly shaped, flexible, or a combination thereof.

Figure 2C:
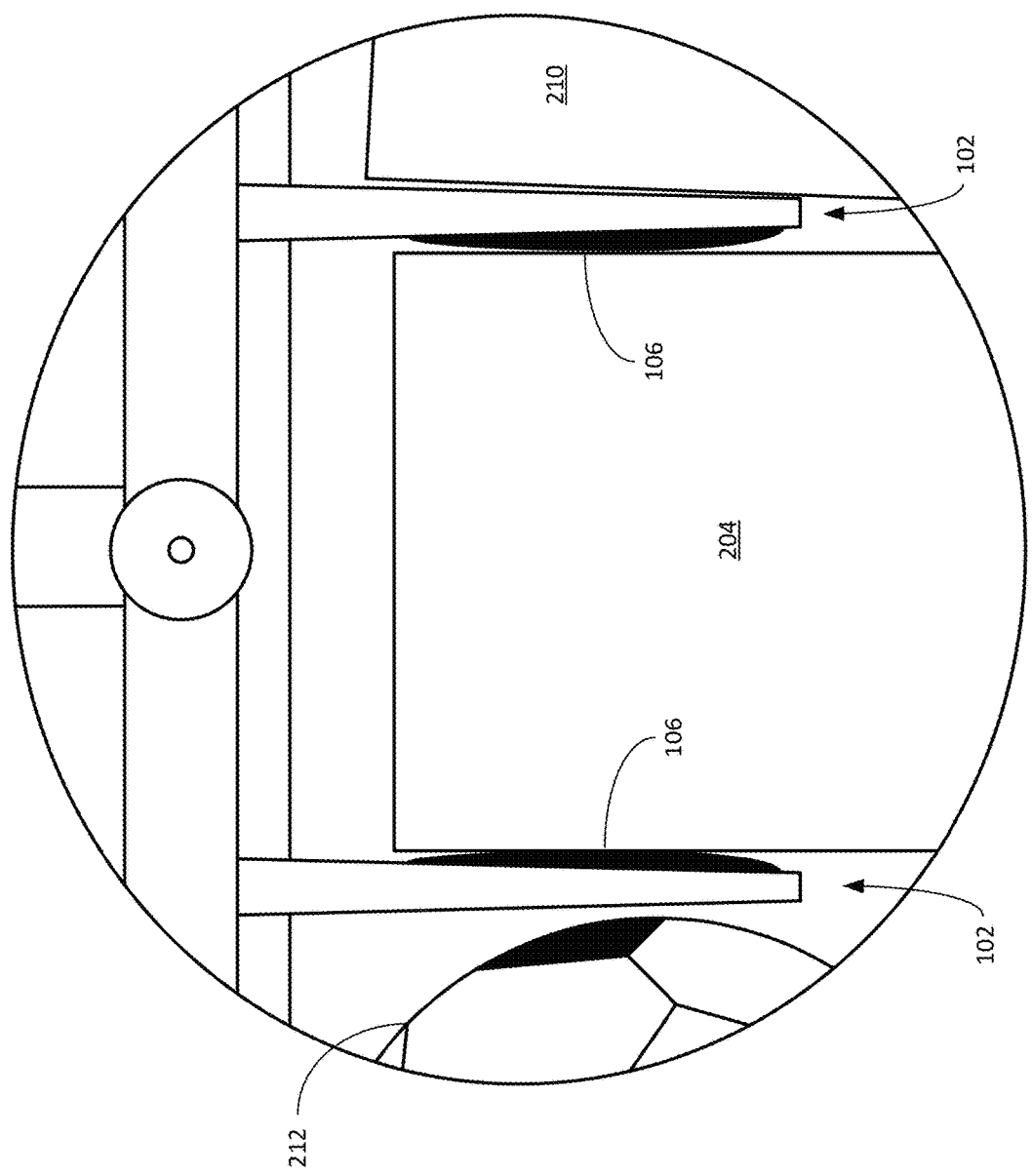

To this end, as shown in FIG. 2C, the grippers 106 of the manipulators 102 can be extended to increase the coefficient of friction, the surface contact area, the surface pressure or all of the above (collectively, the "grip") between the manipulators 102 and the target item 204. As discussed in more detail below, the grippers 106 can be mechanically, pneumatically, or hydraulic extended and can be rigid or flexible. As shown in FIG. 2C, in some examples, the grippers 106 can be inflatable bladders. In this manner, the manipulators 102 can easily slide between the target item 204 and the adjacent items 210, 212 and then the bladders can be inflated to increase the grip on the target item 204. In some examples, as also discussed in more detail below, the grippers 106 may also include a high-friction surface, such as grip tape or a high-friction coating, for example, to further minimize the compressive force required to lift the target item 204.

Figure 2D:
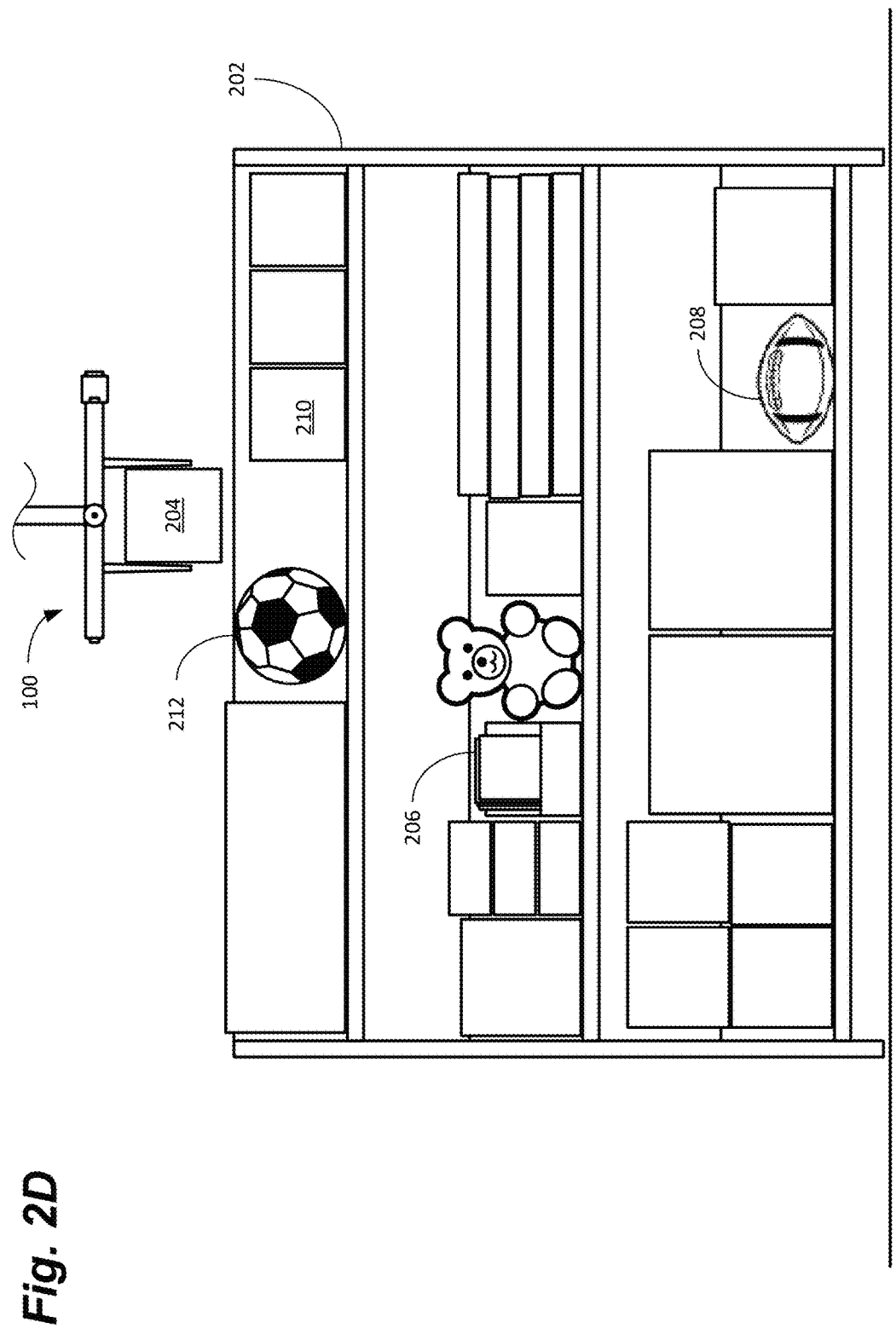

As shown in FIG. 2D, the target item 204 can be lifted off of the shelving unit 202 and the adjacent items 210, 212 can return to their original position having been largely undisturbed. Because the manipulators 102 are low profile and/or low friction with the grippers 106 in the retracted position, the adjacent items 210, 212 are minimally disturbed when the system 100 is inserted between the adjacent items 210, 212 and the target item 204. In the deployed position, the grippers 106 can enable the manipulators 102 to pick up the target item 204 by providing additional grip. Yet, because the outside of the manipulators 102 still present a low friction surface, the adjacent items 210, 212 are minimally disturbed and may simply return to their original location and/or orientation.

Figure 3B:
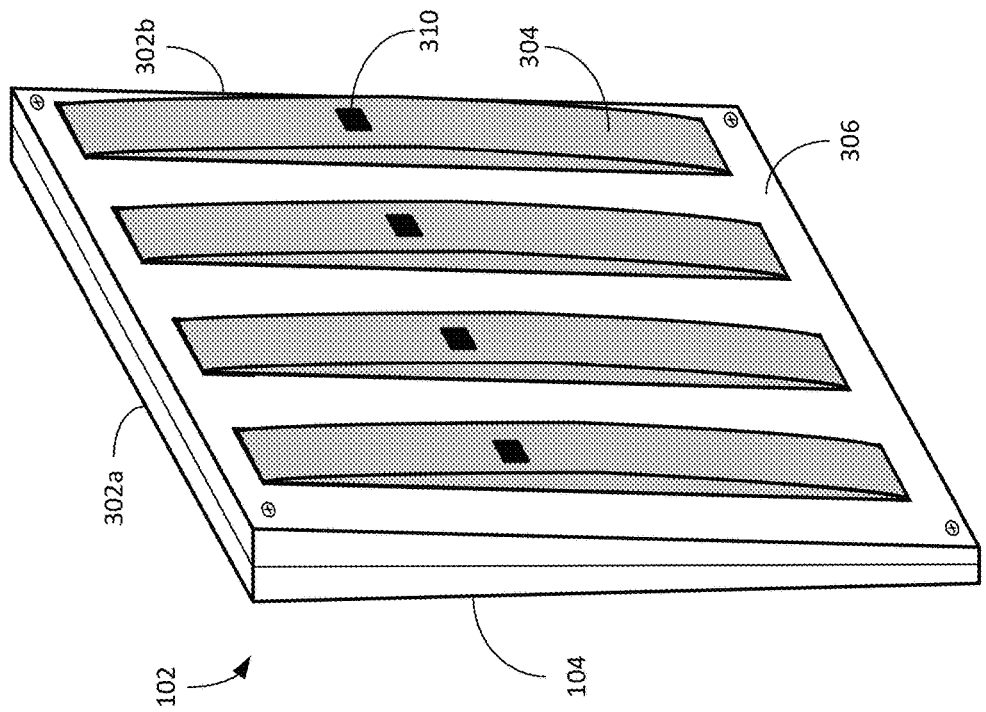
FIGS. 3A and 3B depict a front, perspective view of a vertical hydraulic or pneumatic variable friction manipulator in the retracted (FIG. 3A) and the deployed (FIG. 3B) positions, respectively, in accordance with some examples of the present disclosure.
Figure 3A:
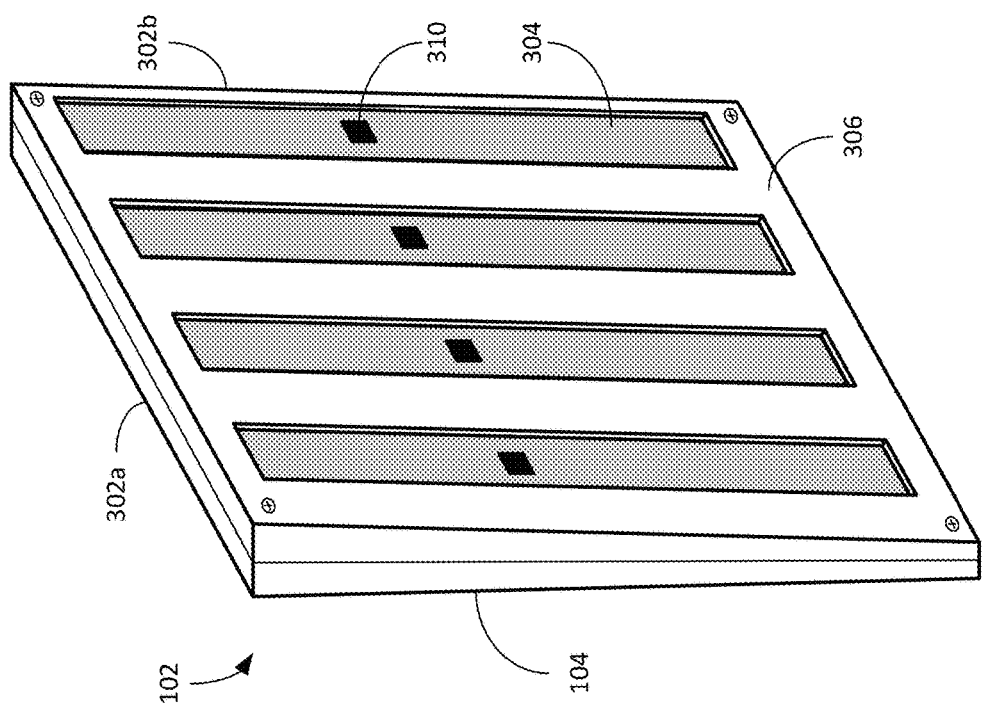

As shown in FIGS. 3A and 3B, in some examples the main body 104 of the manipulators 102 can comprise a relatively stiff, smooth, low friction material. The main body 104 can comprise, for example, aluminum, steel, carbon fiber, or other plastic. In this manner, the manipulators 102 can slip between adjacent items 210, 212, for example, with relative ease. In some examples, as shown, the main body 104 can include two or more sections 302a, 302b to enable the gripper(s) 106 to be inserted into the cavity formed by the two sections 302a, 302b.

In some examples, as shown, the grippers 106 can comprise one or more inflatable bladders 304. Thus, in the retracted position (FIG. 3A), the main body 104 can easily slide between adjacent items 210, 212 and the target item 204 with the grippers 106 slightly below the surface 306 of the main body 104. In the deployed position (FIG. 3B), on the other hand, the inflatable bladders 304 can be inflated such that they protrude above the surface 306 of the main body 104 though one or more openings 308, or slots. The main body 104 can comprise aluminum with one or more openings 308, for example, and the inflatable bladders 304 can comprise rubber or plastic. Thus, when inflated, the inflatable bladders 304 can extend through the openings 308 to protrude above the surface 306 of the main body 104. The grip between the manipulators 102—or rather, the grippers 106—and the target item 204 can be increased with little or no increase in compressive force, although additional compressive force can also be generated with the grippers, if desired.

In some examples, the grippers 106 or the manipulators 102 can comprise one or more sensors to detect the force between the manipulators 102 and the target item 204. As shown, the system 100 can include one or more pressure transducers 310 disposed on the surface 306 of the gripper 106, for example, to detect the pressure between the gripper 106 and the target item 204. Thus, an inventory system associated with the system 100, for example, can provide maximum pressure data for the target item 204. Using this data, the system 100 can retrieve the target item 204, yet ensure the target item 204 is not damaged using feedback from the pressure transducer(s) 310. In other words, the pressure exerted on each target item 204 by the manipulators 102 and grippers 106 can be adjusted according to the construction of the target item 204, its packaging, or other factors.

In other examples, the system 100 can detect damage to the target item 204 using feedback from the pressure transducer(s) 310. In other words, as discussed above, the grippers 106 can be activated to pick up the target item 204 with a predetermined amount of force. If, during the process of moving the target item 204, the force on one or more of the pressure transducer(s) 310 suddenly drops, however, this can indicate, for example, that the box has failed and is being crushed or the target item 204 is falling out of the manipulator 102, among other things. In either situation, the system 100 may stop to regrip the target item 204, send an error message to a central control or worker, or take other appropriate action.

Figure 3D:
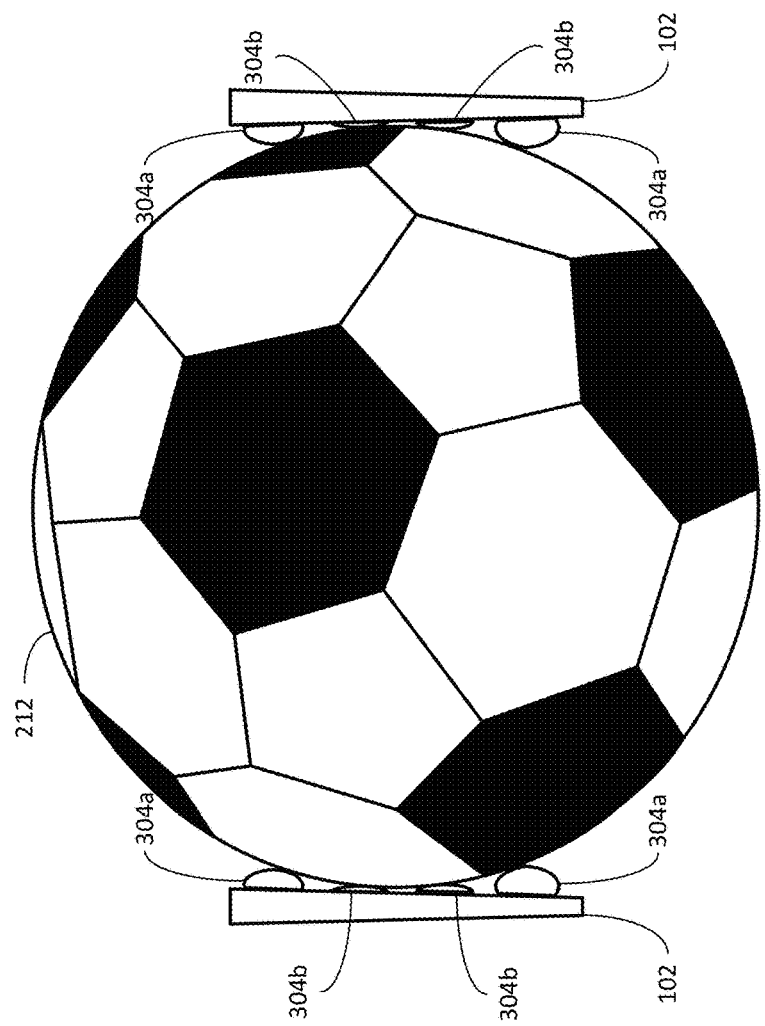
FIG. 3D depicts a front view of the horizontal hydraulic or pneumatic variable friction manipulator of FIG. 3C being used to lift an irregular object (a soccer ball), in accordance with some examples of the present disclosure.
Figure 3C:
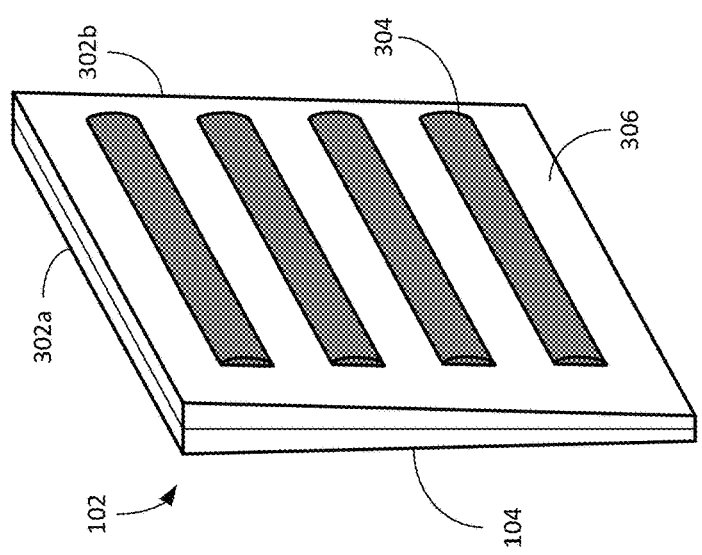
FIG. 3C depicts a front, perspective view of a horizontal hydraulic or pneumatic variable friction manipulator in the deployed position, in accordance with some examples of the present disclosure.

In some examples, as shown in FIGS. 3A and 3B, the grippers 106 can be disposed in a vertical manner. This can enable the manipulators 102 to slide more easily over objects in a vertical direction (e.g., picking items up from the top or bottom). As shown in FIGS. 3C and 3D, in other examples, the grippers 106 can be disposed in a horizontal manner. This can enable the manipulators 102 to slide more easily over objects in a horizontal direction (e.g., picking items up from the side). Of course, in some examples, the manipulators 102 can be mounted on an articulating arm (e.g., a robotic arm) that can rotate the system 100 in many directions to position the gripper 106 as desired for the target item 204.

As shown in FIG. 3D, placing the gripper 106 horizontally, for example, can enable unpackaged or oddly shaped items (like a soccer ball 212) to be securely handled. In other words, this configuration can enable the inflatable bladders 304 to conform to the shape of the soccer ball 212 for a more secure hold. The inflatable bladders 304 can be flexible and can be inflated with a common air or hydraulic source. Thus, while the inflatable bladders 304 may all be at the same pressure, the inflatable bladders 304 may extend different amounts before they encounter the target item 204. In this case, the inflatable bladders 304a located nearer the top and bottom of the soccer ball 212 may extend more than those inflatable bladders 304b located closer to the center of the soccer ball 212 before encountering resistance. Thus, the middle inflatable bladders 304b encounter the soccer ball 212 almost immediately, while the outer inflatable bladders 304a extend further. This has the effect of cradling the soccer ball 212, as shown, providing a secure grip.

Figure 4B:
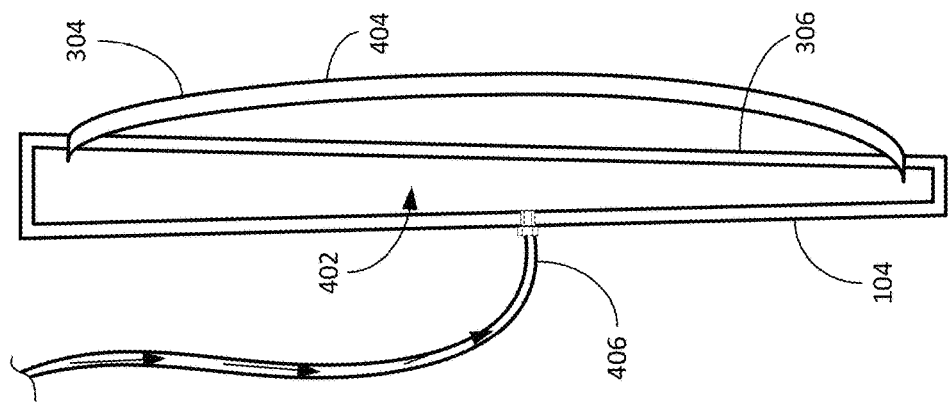
FIGS. 4A and 4B depict a cross-sectional view of a variable friction manipulator with a flexible bladder in a retracted position (FIG. 4A) and a deployed position (FIG. 4B), in accordance with some examples of the present disclosure.
Figure 4A:
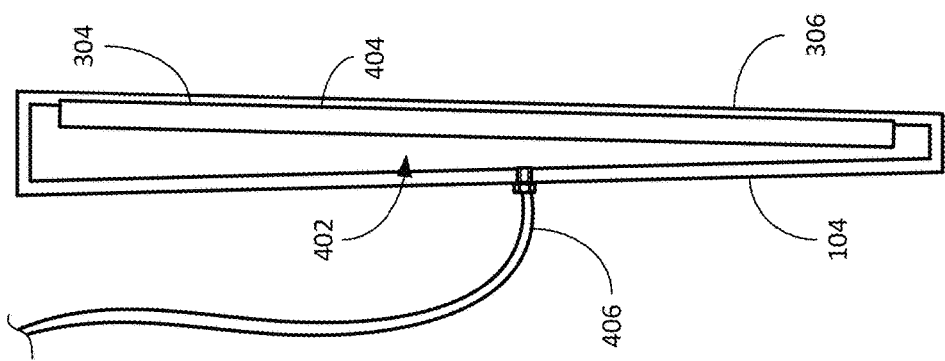

As shown in cross-section in FIGS. 4A and 4B, in some examples, the main body 104 of the manipulator 102 can act as a hydraulic or pneumatic reservoir 402, which can be closed off with the one or more inflatable bladders 304. Thus, in the retracted position shown in FIG. 4A, the reservoir 402 can be at, or below, ambient pressure and the surface 404 of inflatable bladder(s) 304 can be slightly below the (low friction) surface 306 of the main body 104. In this manner, the main body 104 is relatively thin and low friction to enable it to be easily inserted between multiple items.

As shown in FIG. 4B, in the deployed position, on the other hand, air, hydraulic fluid, or other medium can be supplied to the reservoir 402 via a hydraulic or pneumatic supply line 406 to inflate the inflatable bladder(s) 304. In this configuration, the surface 404 of the inflatable bladder(s) 304 can protrude past the surface 306 of the main body 104. The inflatable bladder(s) 304 can comprise a higher friction surface that the surface 306 of the main body to aid in lifting the target item 204. In some examples, the inflatable bladder(s) 304 can be made from a higher friction material (e.g., rubber) than the surface 306 of the main body (e.g., aluminum). In other examples, the inflatable bladder(s) 304 can include a surface treatment instead of, or in addition to, the material itself to further increase the coefficient of friction between the manipulators 102 and the target item 204.

In some examples, rather than using the main body 104 as a reservoir, the inflatable bladder(s) 304 can be self-contained. In other words, the supply line 406 can be connected directly to the inflatable bladder 304, with the main body 104 merely acting as a housing. This configuration may reduce maintenance time and/or cost as it is not necessary to seal the inflatable bladder(s) 304 to the main body 104, for example. Of course, while shown and described as a hydraulic or pneumatic inflatable bladder 304, in other examples, the inflatable bladder 304 can comprise, for example, a shape memory alloy (SMA), muscle wire, or other electromechanical device. In this configuration, applying an electrical current to the inflatable bladder 304 can cause the inflatable bladder 304 to assume the retracted position (FIG. 4A), for example, and removing the electrical current can cause the inflatable bladder 304 to assume the deployed position (FIG. 4B), or vice-versa.

Figure 5B:
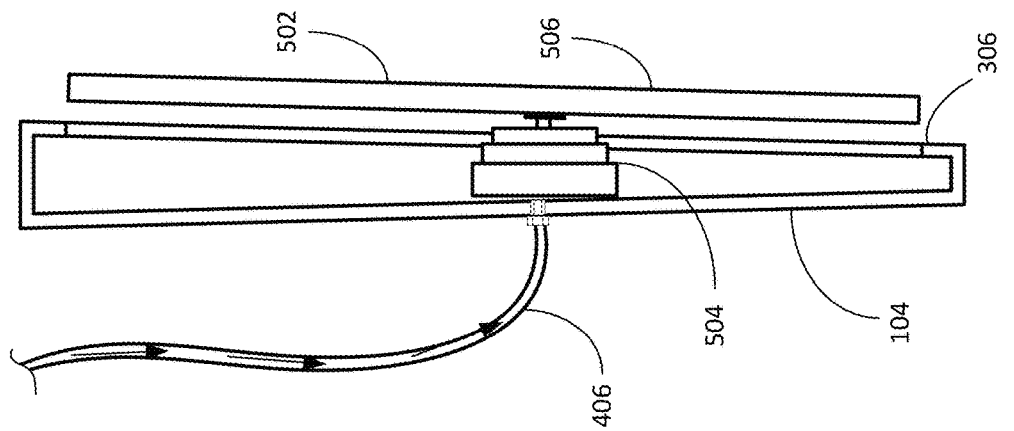
FIGS. 5A and 5B depict a cross-sectional view of a variable friction manipulator with a hydraulic cylinder and a plate in a retracted position (FIG. 5A) and a deployed position (FIG. 5B), in accordance with some examples of the present disclosure.
Figure 5A:
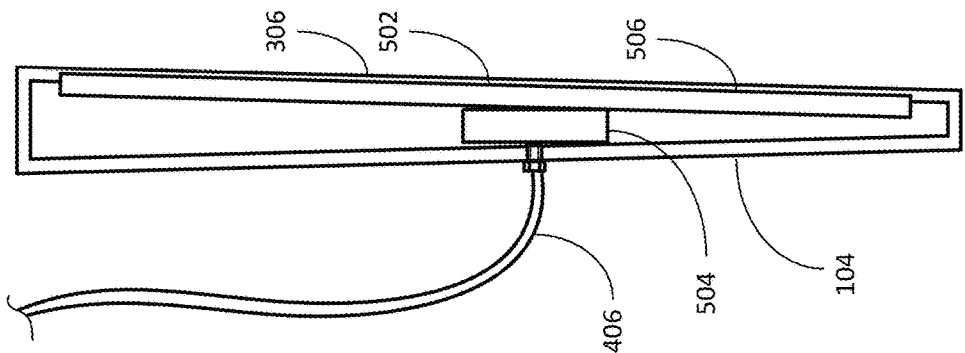

In other examples, as shown in FIGS. 5A and 5B, the gripper(s) 106 can comprise a plate 502, or arm, mounted on a hydraulic or pneumatic cylinder 504. In this manner, in the retracted position, cylinder 504 can be at, or below, ambient pressure and the surface 506 of plate 502 can be slightly below the (low friction) surface 306 of the main body 104. As before, in this configuration, the main body 104 can be relatively thin and low friction to enable it to be easily inserted between multiple items.

As shown in FIG. 5B, in the deployed position, on the other hand, air, hydraulic fluid, or other medium can be supplied to the cylinder 504 via a hydraulic or pneumatic supply line 406 to extend the cylinder 504 and thus, the plate 502. In this configuration, the surface 508 of the plate 502 can protrude past the surface 306 of the main body 104. As before, the plate 502 can comprise a higher friction surface than the surface 306 of the main body to aid in lifting the target item 204. In some examples, the plate 502 can be made from a higher friction material (e.g., rubber) than the surface 306 of the main body 104 (e.g., aluminum).

In other examples, the plate 502 can include a surface treatment instead of, or in addition to, the material itself to further increase the grip between the manipulators 102 and the target item 204. In some examples, the plate 502 can comprise a rough sanded or shot blasted surface, for example, to increase its roughness. In other examples, the plate 502 can include non-skid tape, spray-on bedliner, or other friction inducing surface treatment.

Figure 6B:
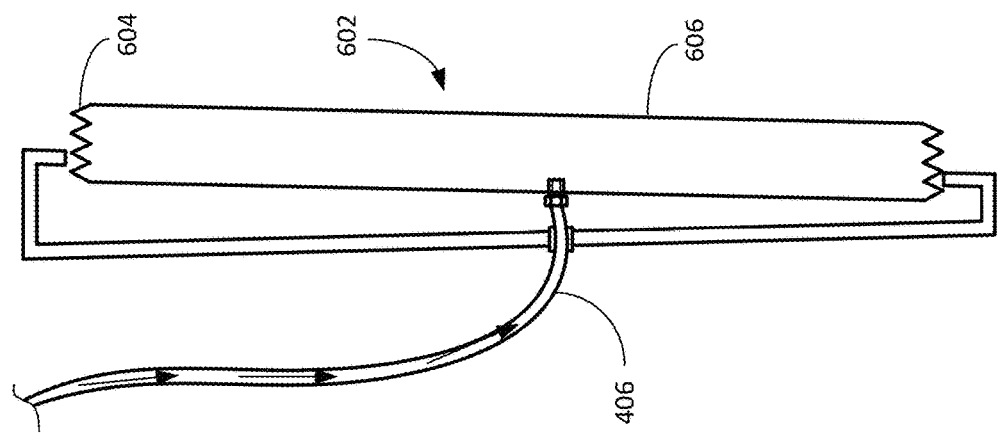
FIGS. 6A and 6B depict a cross-sectional view of a variable friction manipulator with a pleated diaphragm in a retracted position (FIG. 6A) and a deployed position (FIG. 6B), in accordance with some examples of the present disclosure.
Figure 6A:
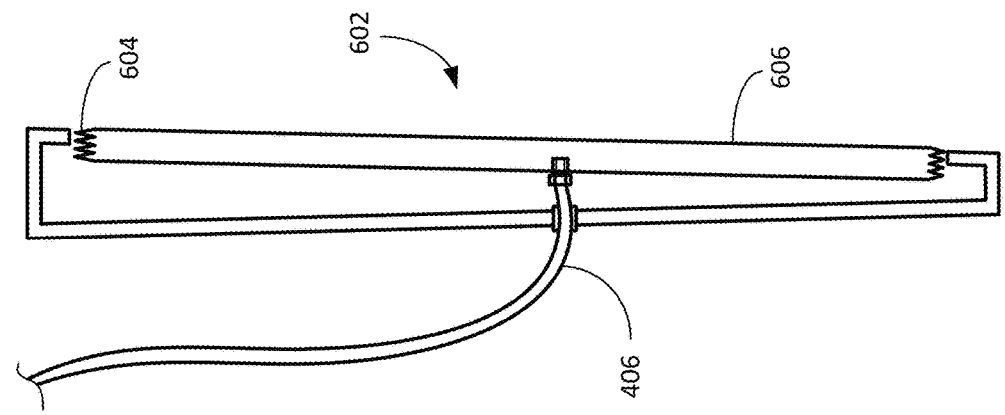

In some examples, as shown in FIGS. 6A and 6B, the system 100 can include a main body 104 and a pleated diaphragm 602. As the name implies, the pleated diaphragm 602 can include a plurality of pleats 604 that expand and contract based on the air or hydraulic pressure inside the pleated diaphragm 602. In this configuration, rather than deforming to inflate as discussed above (FIGS. 4A and 4B), the pleats 604 can extend to enable the surface 606 of the pleated diaphragm 602 to extend from the retracted position to the deployed position. Thus, as air or hydraulic fluid is provided from a supply line 406, for example, the surface 606 of the pleated diaphragm 602 can move from a position slightly below the surface 306 of the main body 104 to a position above the surface 306 of the main body 104.

Due to its construction, the pleated diaphragm 602 may provide a larger area of engagement and/or more even surface pressure between the manipulators 102 and the target item 204 than the bowed surface 404 of the inflatable bladder 304. This may be useful for systems 100 used primarily for flat objects like boxes, for example, while the conformable surface 404 of the inflatable bladder 304 may be more suitable for use with irregular shaped or curved objects, for example. Of course, each manipulator 102 can include more than one type of gripper 106 to suit a variety of applications. Indeed, each manipulator 102 can include more than one type of gripper 106, each of which can be independently operated.

Figure 7A:
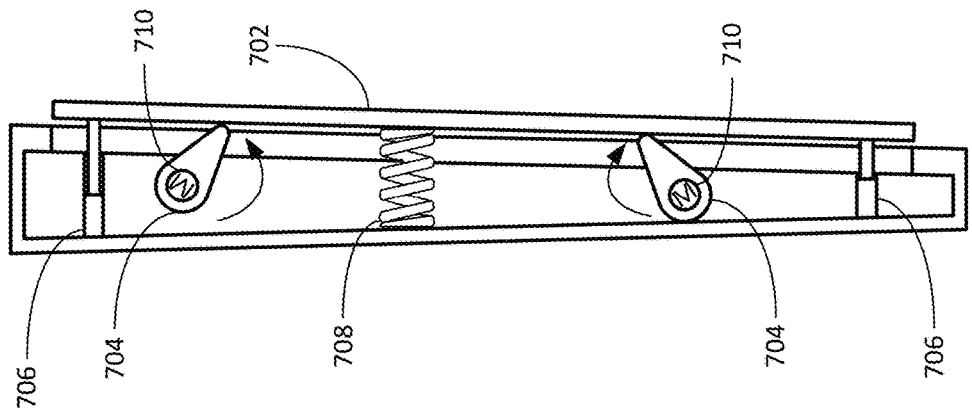
FIGS. 7A and 7B depict a cross-sectional view of a variable friction manipulator with one or more eccentrics and a plate in a retracted position (FIG. 7A) and a deployed position (FIG. 7B), in accordance with some examples of the present disclosure.
Figure 7B:
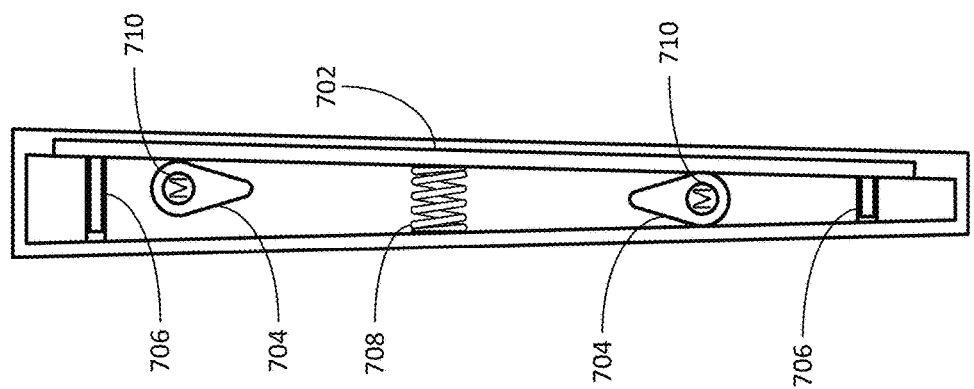

As shown in FIGS. 7A-8B, the system 100 can also include a variety of mechanical actuation methods. As shown in FIGS. 7A and 7B, the manipulators 102 can include, for example, a plate 702 actuated by one or more eccentrics 704. In this configuration, the plate 702 can be attached to one or more sliding pins 706 to enable the plate 702 to move between the retracted position and the deployed position. The plate 702 can be act on by the eccentrics to move the plate 702 back and forth. In some examples, the plate can be attached to a biasing member 708 (e.g., a spring) to positively move the plate 702 from the deployed position to the retracted position when the eccentrics 704 are retracted (FIG. 7A).

In some examples, the eccentrics 704 can be operated by a rotary actuator 710 such as, for example, electric (e.g., servo), pneumatic, or hydraulic motor to rotate the eccentrics 704 and thus, the plate 702, from the retracted position to the deployed position. In some examples, the eccentrics 704 can be connected to the plate 702 via a pivot, or other means, to enable the eccentrics 704 to both deploy and retract the plate 702. In other examples, the eccentrics 704 can merely exert pressure on the plate 702 to move it form the retracted position to the deployed position, with the biasing member 708 returning the plate 702 to the retracted position when the eccentrics 704 are returned.

Figure 7C:
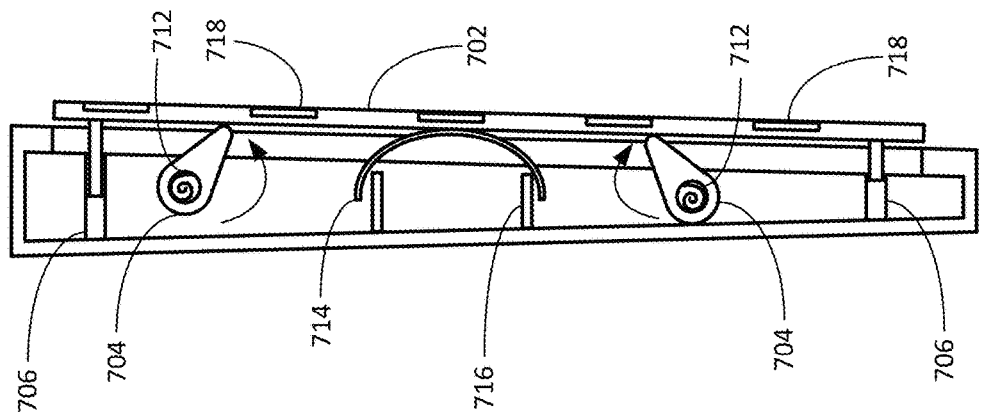
FIGS. 7C and 7D depict a cross-sectional view of a variable friction manipulator with one or more shape memory alloy (SMA) actuators and a plate in a retracted position (FIG. 7C) and a deployed position (FIG. 7D), in accordance with some examples of the present disclosure.
Figure 7D:
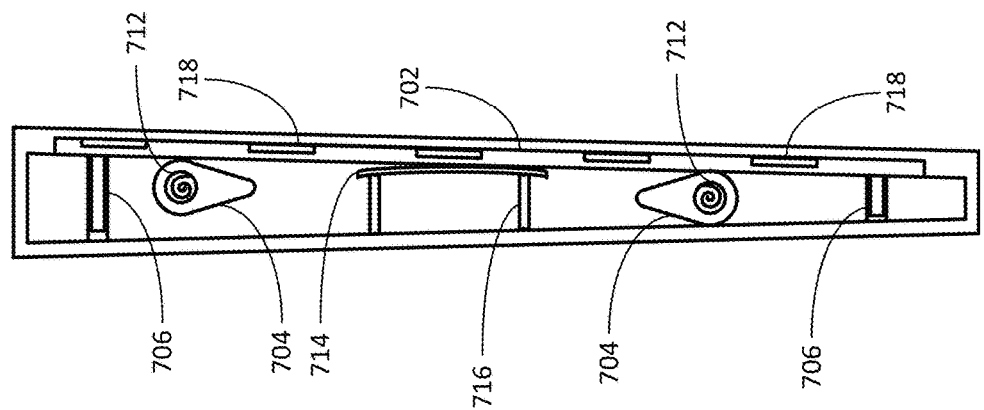

As discussed above, some or all of the components discussed above can comprise electrically or heat activated components such as, for example, SMAs or muscle wire (collectively, shape memory components). In this configuration, as shown in FIGS. 7C and 7D, rather than using rotary actuators 710 comprising motors, for example, the eccentrics 704 can be actuated using an SMA rotary actuator 712. In some examples, the SMA rotary actuator 712 can comprise a coil of SMA material inside the eccentric 704. Thus, with no electric current applied, the coil of the SMA rotary actuator 712 can be relatively tightly wound within the eccentric 704. This, in turn, can position the plate 702 in the retracted position (FIG. 7C). When current is applied to the coil in the SMA rotary actuator 712, on the other hand, the coils unwind slightly, moving the eccentrics 704 (and the plate 702) into the deployed position (FIG. 7D). In some examples, removing the current from the SMA rotary actuator 712 can cause it to recoil, positively moving the plate 702 back into the retracted position. In other example, as before, a biasing member 708 (e.g., a spring or similar mechanism) can be used to retract the plate 702.

In other examples, the plate 702 can be actuated using a direct SMA actuator 714. In this configuration, the direct SMA actuator 714 can comprise a wire, rod, or sheet of SMA mounted on one or more pedestals 716. Thus, with no electric current applied, the direct SMA actuator 714 can be relatively flat with the plate 702 in the retracted position (FIG. 7C). When current is applied to the direct SMA actuator 714, on the other hand, the direct SMA actuator 714 can bow or flex moving the plate 702 into the deployed position (FIG. 7D). In some examples, the direct SMA actuator 714 can be attached to the plate 702. In this configuration, removing the current from the direct SMA actuator 714 can cause it to flatten, positively moving the plate 702 back into the retracted position. In other example, as before, a biasing member 708, or similar mechanism, can be used to retract the plate 702. In this configuration, the direct SMA actuator 714 need not be connected to the plate 702, but can merely press against it, for example.

In some examples, the plate 702 can also include one or more electromagnets 718. In addition to the plate 702 providing additional friction, therefore, the plate 702 can also provide magnetic force. This can be particularly useful for ferromagnetic target items 204, for example, though most materials have some magnetism. In some examples, the electromagnets 718 can be activated (e.g., electrified) at the same time as the SMA actuators 712, 714. In other examples, the electromagnets 718 can be separately controlled.

Figure 8B:
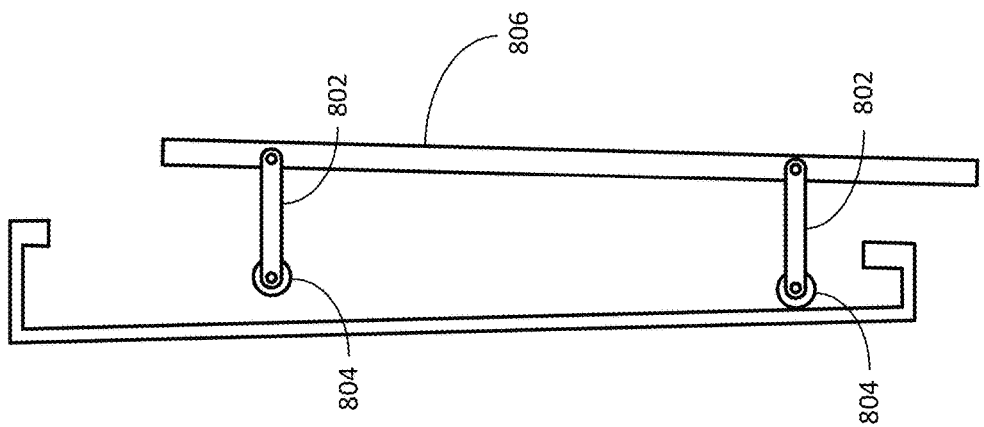
FIGS. 8A and 8B depict a cross-sectional view of a variable friction manipulator with lever arms and plate in a retracted position (FIG. 8A) and a deployed position (FIG. 8B), in accordance with some examples of the present disclosure.
Figure 8A:
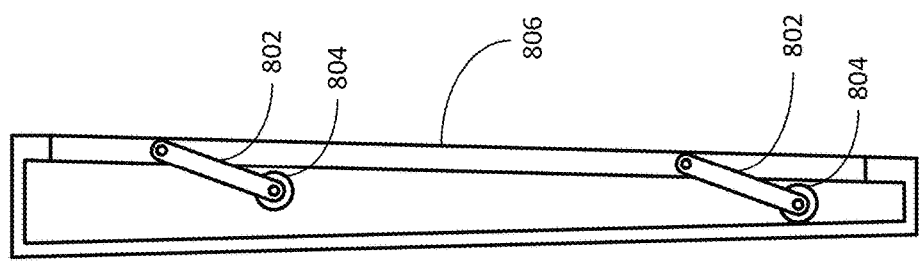

As shown in FIGS. 8A and 8B, the system 100 can instead include one or more lever arms 802 actuated by one or more rotary actuators 804 (e.g., a servo motor) to move a plate 806 between a retracted position and a deployed position. As shown, it may be useful to move the plate 806 through an arc from the retracted position to the deployed position to lower the plate 806 around the target item 204, exert variable pressure on the target item 204, or for other reasons. Thus, the plate 806 can move through an arc, moving out and down (in this case) at the same time. In other examples, the plate 806 can include slots where the lever arms 802 attach, for example, to enable the lever arms 802 to move in opposite directions. This, in turn, moves the plate 806 in a substantially linear manner (i.e., without vertical motion in this case) between the retracted position to the deployed position.

As discussed above, the system 100 can be used to remove items from crowded shelves, trays, or other storage locations. And, while the system 100 has thus far been shown and described as operating in a vertical manner (e.g., from the top like a crane), as shown in FIGS. 9A-9D, the system 900 can also be used in the horizontal manner. This may be useful to remove items off shelves lower than the top shelf, for example, in warehouse with low ceilings, or anytime access is limited. Indeed, when used in conjunction with a robotic arm, or other articulating mechanism, the orientation of the system 100, 900 is somewhat immaterial. In other words, items can be lifted, moved, or otherwise repositioned using many different poses and from almost any angle. To this end, FIGS. 9A-9D depict a shelving system from the top, with the system 900 maneuvering in a horizontal manner.

As shown, the system 900 can include two-piece manipulators 902. In this configuration, each manipulator 902 can include an outer manipulator 904 and in inner manipulator 906. As before, the outer manipulators 904 can be moved in and out to adjust to the relevant dimension of the target item 908 and can slide in between the target item and adjacent items 910, 912. The inner manipulators 906 can then be moved independently of the outer manipulator 904 to retrieve the target item 908. The inner manipulators 906 can be slideably mounted on the outer manipulators 904, for example, and may be activated by a screw drive, linear actuator, hydraulic or pneumatic ram, or other suitable mechanism. In this configuration, the inner manipulators 906 can also include grippers 914. As before, once the system 900 is in place around the target item 908, the grippers 914 can be inflated, extended, or otherwise activated, to increase the grip between the inner manipulator 906 and the target item 908.

Figure 9B:
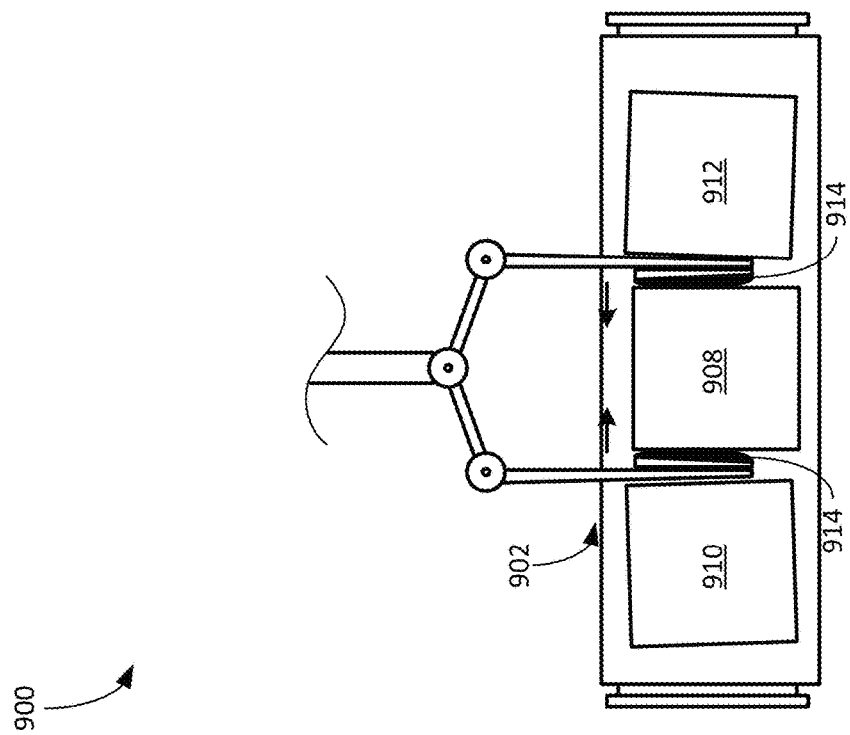
Figure 9A:
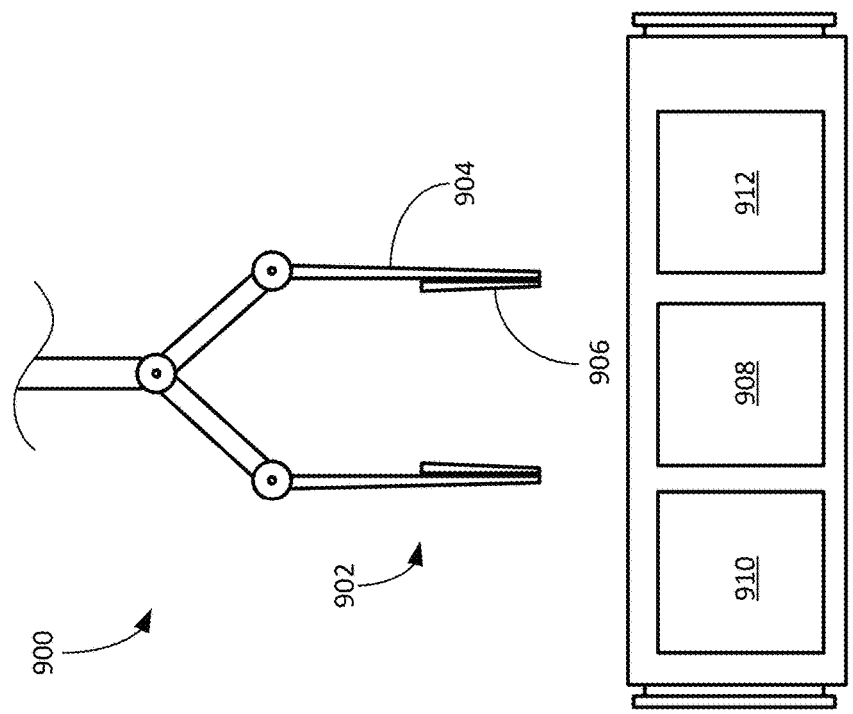

Thus, as shown in FIG. 9A, the outer manipulator 904 can be moved in an out to adjust to the width of various target items 908. As shown in FIG. 9B, the manipulators 902 can then be inserted between the target items 908 and any adjacent items 910, 912. Again, because the width of the manipulators 902 is relatively small (narrow), the manipulators 902 easily slip between the target item 908 and the adjacent items 910, 912. Thus, while the adjacent items 910, 912 may have to move slightly (e.g., tip or slide outward slightly), they remain largely undisturbed.

In this configuration, the inner manipulators 906 can also include grippers 914. As before, with the manipulators 902 in place, the grippers can be inflated, moved, or otherwise reconfigured to grip the target item 908. In some examples, the gripper can also include a high-friction surface to increase the grip of the manipulators 902 on the target item 908. In some examples, the gripper 914 can include an anisotropic material that has a low coefficient of friction when the manipulators 902 are being inserted (i.e., in a first direction) and a high coefficient of friction when the target item 908 is being lifted (i.e., in a second direction).

As shown in FIG. 9C, when the grippers 914 have been repositioned to grip the target item 908, the inner manipulators 906 can be moved from a tip 916 of the outer manipulator 904 to a root 918 of the outer manipulator 904 to lift the target item 908 off the shelf. Thus, in a horizontal configuration, as shown, the movement from tip 916 to root 918 can be a horizontal motion—i.e., "out" to "in." In a vertical configuration, on the other hand, the movement from tip 916 to root 918 can be a vertical motion—i.e., "down" to "up."

It should be noted that, in this configuration, the outer manipulators 904 remain substantially motionless. So, for example, the outer manipulators 904 may be placed on the shelf next to the adjacent items 910, 912, for example, to steady an outstretched robotic arm. The outer manipulators 904 can remain in place to enable the target item 908 to be easily lifted or moved. In addition, the outer manipulators 904 can form a partition of sorts, which can substantially prevent the adjacent items 910, 912 from being further disturbed as the target item 908 is being lifted or moved. This may prevent the adjacent items 910, 912 from being knocked off the shelf or getting snagged on (or by) the outer manipulators 904, among other things. As shown in FIG. 9D, once the inner manipulators 906 have been moved from tip 916 to root 918 (i.e., up or out), the system 900 can be removed from between the adjacent items 910, 912.

Figure 9F:
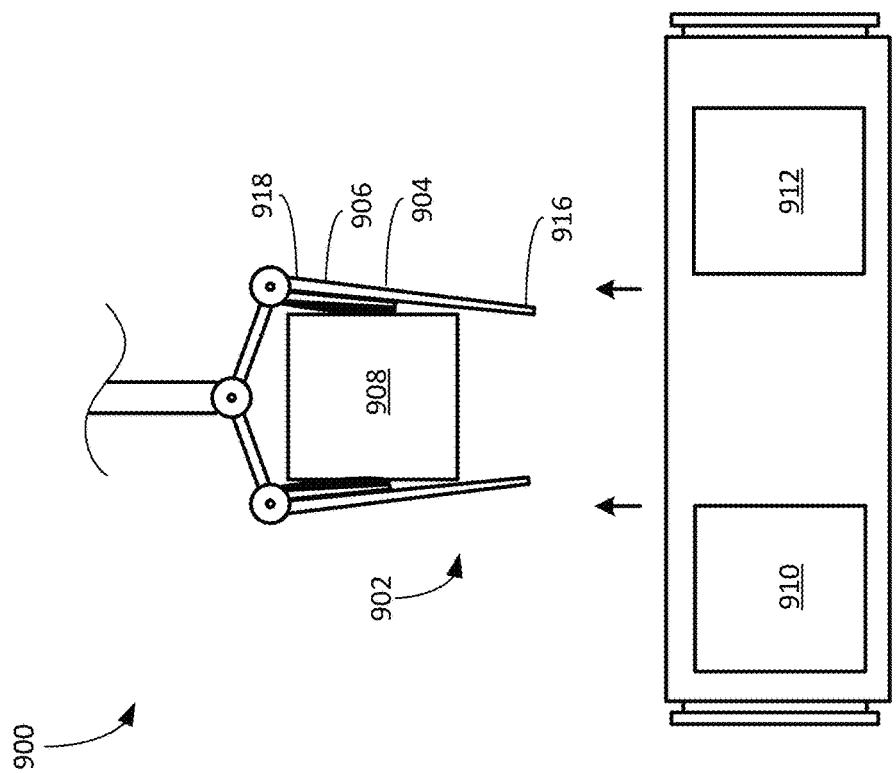
FIGS. 9E and 9F depict a tilting or pivoting version of the variable friction manipulator system with inner and outer manipulators of FIGS. 9A-9D, in accordance with some examples of the present disclosure.
Figure 9E:
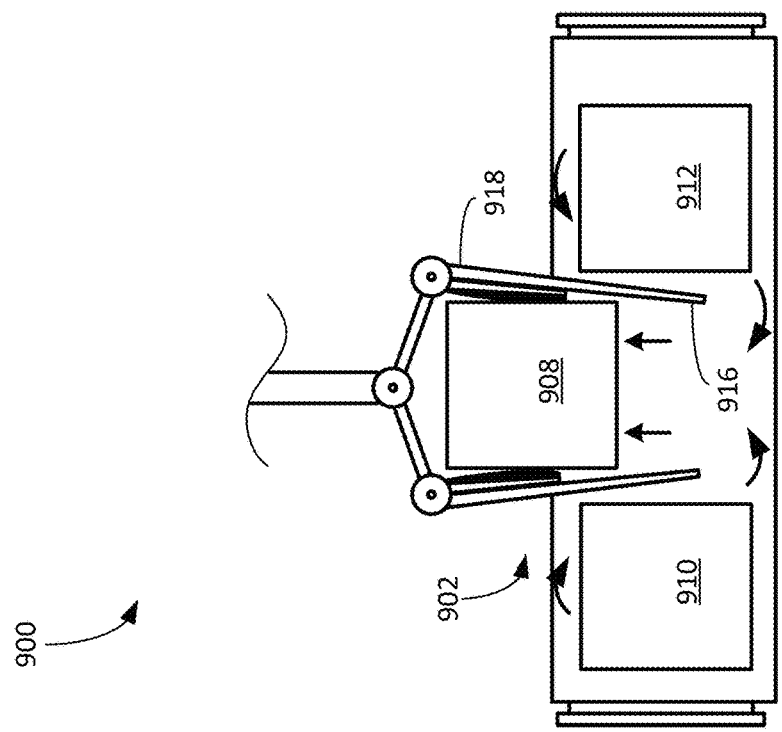

In some examples, as shown in FIGS. 9E and 9F, when the inner manipulators 906 are in the retracted position (i.e., proximate to the root 918), the outer manipulators 904 can be repositioned slightly inward (arrows) to enable the system 900 to be smoothly retracted from between the adjacent items 910, 912 with minimal disturbance to the adjacent items 910, 912. In some examples, the grippers 914 can be retracted or deflated slightly, for example, to enable the outer manipulators 904 to be moved or rotated slightly inward. In other examples, the outer manipulators 904 can be pivoted in slightly at the bottom (arrows) to provide additional clearance. Whether they are repositioned or not, however, the outer manipulators 904 can enable the inner manipulators 906 and the target item 908 to be removed from the shelf with little, or no, disturbance to the adjacent items 910, 912.

Figure 10B:
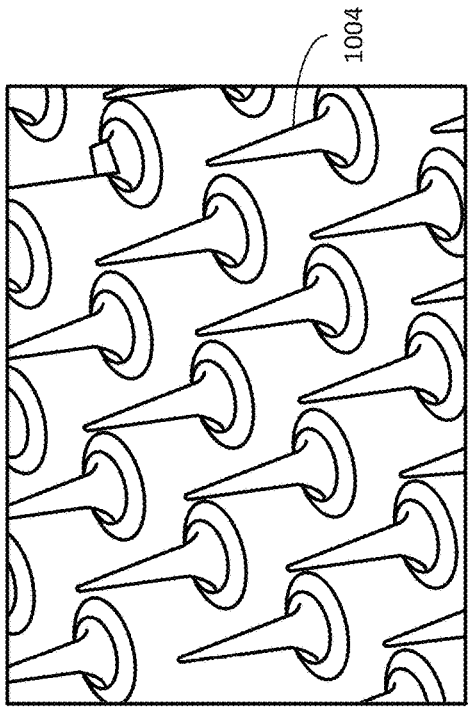
FIGS. 10A-10C depict micro suction cups (FIG. 10A), micro needles (FIG. 10B), and micro pyramids (FIG. 10C), that can be used on various components of the system to increase the grip on these components, in accordance with some examples of the present disclosure.
Figure 10A:
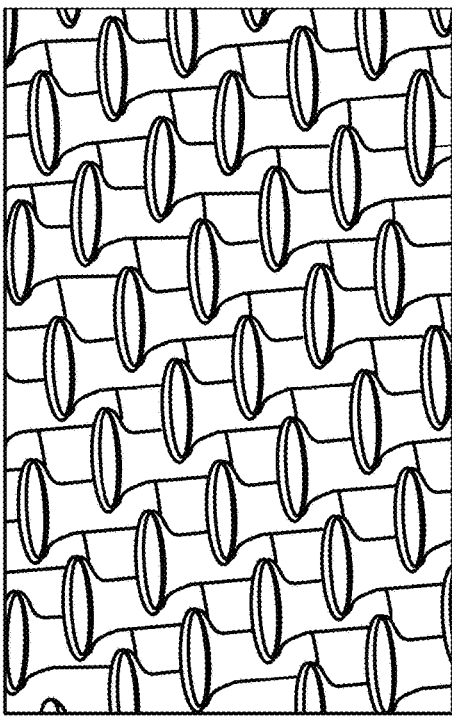
Figure 10C:
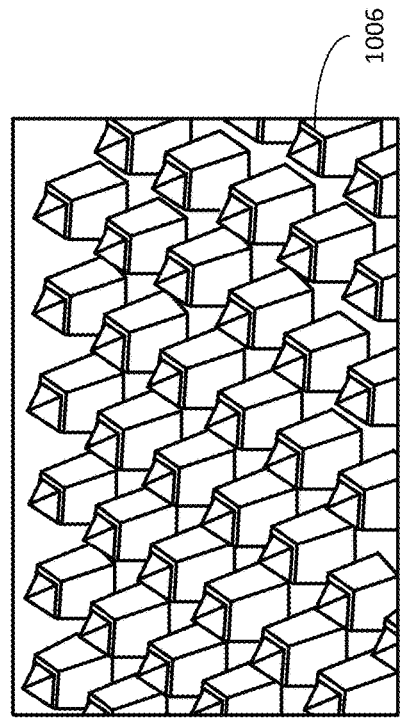

As shown in FIGS. 10A-10C, in some examples, one or more components on the system 100, 900 can include a high friction surface. In some examples, the grippers 106, 914 can include a high-friction surface, while the surface of the main body 104 or inner manipulator 906, for example, can be relatively low friction. In this manner, the manipulators 102 can be easily placed between adjacent items 210, 212 on densely packed shelves, for example, but then can provide the necessary friction to lift the target item 204 off the shelf.

As shown in FIGS. 10A-10C, one or more surfaces of the system 100, 900 can include micro features 1000 that are provided to increase the grip between the grippers 106, 914 and the target item 204, 908. As shown in FIG. 10A, for example, one or more surfaces of the system 100, 900 can include micro suction cups 1002. As the name implies, the surface of the gripper 106, 914, for example, can include hundreds or thousands of microscopic suction cups 1002. In this manner, when the grippers 106, 914 are moved into contact with the target item 204, 908, each micro suction cup 1002 can create a slight vacuum between the gripper 106, 914 and the target item 204, 908. This serves to increase the grip between the system 100, 900 and the target item 204, 908. In some examples, the system 100, 900 can also include a vacuum source (e.g., engine vacuum or a vacuum pump) to create additional vacuum at the gripper 106, 914. See, FIG. 12.

Similarly, in some examples, one or more surfaces of the system 100, 900 can include micro needles (FIG. 10B) or micro pyramids (FIG. 10C). In either case, the micro needles 1004 or micro pyramids 1006 can superficially puncture the surface of the target item 204, 908 to increase the friction between the grippers 106, 914 and the target item 204, 908. Due to their microscopic size, however, the micro needles 1004 or micro pyramids 1006 increase grip, but do not noticeably damage the surface of the target item 204, 908.

In some examples, the micro features 1000 can be "activated" by inflating, or otherwise deploying, the grippers 106, 914. In other words, the surface of the grippers 106, 914 can be covered with micro needles 1004, for example, that in the deflated position lie flat and have little, or no, effect on the friction provided by the gripper 106, 914. In the deployed position (e.g., when inflated), on the other hand, the micro needles 1004 reposition to create additional grip.

So, for example, if the gripper 106, 914 comprises an inflatable bladder 304, the micro needles 1004 may lay flat against the surface 404 in the retracted position (FIG. 4A), but stand substantially perpendicular to the surface 404 in the deployed (inflated) position (FIG. 4B).

In some examples, one or more surfaces of the system 100, 900 can include an anisotropic material—or a material that has a high coefficient of friction in one direction and a low coefficient of friction in another direction. Thus, an inner surface of the manipulators 102, 902 for example, can comprise an anisotropic material that enables the manipulators 102 to be easily inserted between adjacent items 210, 212 on a shelf, for example, but then provide extra friction when attempting to lift or move the target item 204. In this configuration, the anisotropic material can have a low coefficient of friction in a first direction (e.g., downward or inward) direction, and a high coefficient of friction in a second direction (e.g., upward or outward).

The anisotropic material can comprise, for example, micro needles 1004 (FIG. 10B) that are flexible in the first direction and rigid in the second direction. Thus, as the manipulators 102 are inserted from above, for example, as the manipulators 102 move down, the micro needles 1004 bend up and present a low friction surface in the downward direction. When the manipulators 102 are moved up to lift the target item 204, however, the micro needles 1004 resist bending in the upward direction and/or straighten and grip the target item 204. Thus, the manipulators 102 can be easily inserted, but then provide additional grip to lift the target item 204. As mentioned above, this effect may also be achieved by inflating the grippers 106, 914 and causing the micro needles 1004 to stand up, for example.

Examples of the present disclosure can also comprise a method 1100 for picking and placing items, particularly items from densely packed shelves in a warehouse environment. For ease of explanation and clarity, the method 1100 is described below with reference to the system 900 discussed above in FIGS. 9A-9D. One of skill in the art will recognize, however, that the method 1100 is also applicable to the system 100 described above in FIGS. 1A-2B; and, indeed, to any system utilizing a variable friction manipulator, or similar mechanism.

At 1102, the system 900 can be positioned proximate to the target item 908. This can be done using, for example, one or more cameras and machine vision algorithms that enable the system 900 to be positioned proximate to the target item 908, for example, and the manipulators 902 to be positioned between the target item 908 and the adjacent items 910, 912. In some examples, the system 900 can identify the edges of the target item 908, for example, and position the manipulators 902 just outside the periphery of the target item 908. In other examples, the system 900 can use fiducial markers on the warehouse floor, shelves, laser scanners, global positioning systems (GPS), or other methods known in the art.

At 1104, once positioned the manipulators 902 can be inserted between the target item 908 and the adjacent items 910, 912. As discussed above, the manipulators 902 can be relatively thin and present a low friction surface. This can enable the manipulators 902 to be inserted with little, or no, resistance or disturbance to the adjacent items 910, 912. As shown, even on a densely packed shelving unit 202, the adjacent items 910, 912 may merely have to tip outward slightly.

At 1106, the manipulators 902 can be closed around the target item 908. As mentioned above, due to their thin profile, however, the manipulators may lack the strength (i.e., rigidity) to pick the target item 908 up using only friction created by compressive force between the manipulators 902 and the target item 908. Manipulators 902 that are thin aluminum tines, for example, are easily inserted between the target item 908 and the adjacent items 910, 912, but may be too flexible to provide the necessary compressive force to pick up the target item 908. In addition, smooth metal manipulators 902 may present a relatively low friction surface, further exacerbating the problem.

To this end, at 1108, in some examples, the manipulators 902 can be "expanded" to present a higher friction and/or flexible surface. Thus, one or both manipulators 902 can include a gripper 914 that, when exposed (i.e., raised above the surface of the manipulator 902), provides a high friction and/or conformable surface to aid in lifting the target item 908. As discussed above, the gripper(s) 914 can be, for example, pneumatically, hydraulically, electrically, or electro-mechanically actuated. In this manner, the grippers 914 can move from a retracted position, in which the surface of the gripper(s) 914 is below the surface of the inner manipulator 906, for example, to a deployed position, in which the surface of the gripper(s) 914 is above the surface of the inner manipulator 906. In the deployed position, the gripper 914 can increase the grip of the manipulator 102 on the target item 908 by increasing the grip pressure, contact area, and/or the coefficient of friction between the manipulator 102 and the target item 908 (collectively, the grip).

At 1110, in some examples, such as in the case of two-piece manipulators 902, the inner manipulators 906 can then be retracted (e.g., moved in, up, or otherwise depending on orientation). As discussed above, in some examples, the manipulators 902 can include an inner manipulator 906 and an outer manipulator 904. In this configuration, the inner manipulators 906 can be raised, while the outer manipulators 904 remain in place. In this manner, the outer manipulators 904 serve to stabilize the adjacent items 910, 912 and/or the attached mechanism (e.g., a robotic arm or forklift), while the target item 908 is lifted off the shelving unit 202.

At 1112, the system 900 can then move away from the shelving unit with the target item 908. In some examples, the target item 908 may then be placed on an inventory robot to be transported for further processing (e.g., shipping and handling). In other examples, the target item 908 may be placed on a conveyor system for further processing. In still other example, the system 900 can be used on an automated or manually operated forklift, for example, which can then delivery the target item 908 to various locations for further processing.

In some examples, as shown in FIGS. 12A and 12B, the system 100, 900 can also employ vacuum assist. For simplicity of explanation, the vacuum assist is shown in conjunction with the configuration shown in FIGS. 7A and 7B. One of skill in the art will recognize, however, that vacuum assist can be added to any of the grippers 106, 914 discussed herein or indeed, to other types of grippers 106, 914. Regardless, in addition to the additional grip provided by the gripper 106, 914 (or the plate 702 in this example), the gripper 106, 914 can be supplied with vacuum to provide a vacuum force, F, against the target item 204, 908.

In some examples, the surface 1202 of the plate 702 can include one or more apertures 1204, or orifices. In other examples, the surface 1202 can merely comprise a porous material that enables airflow from the surface 1202 inward. In this manner, when vacuum is applied from a vacuum source 1206, the vacuum force, F, is exerted on the target item 204, 908. The vacuum source 1206 can comprise manifold vacuum from a forklift engine, for example, or vacuum provided by a dedicated vacuum pump.

Figure 13A:
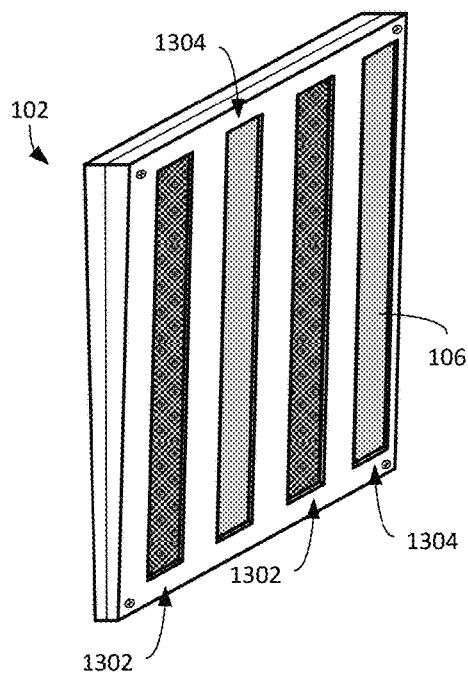
FIGS. 13A-13C depict a front, perspective view of the variable friction manipulator with multiple friction surfaces, in accordance with some examples of the present disclosure.
Figure 13B:
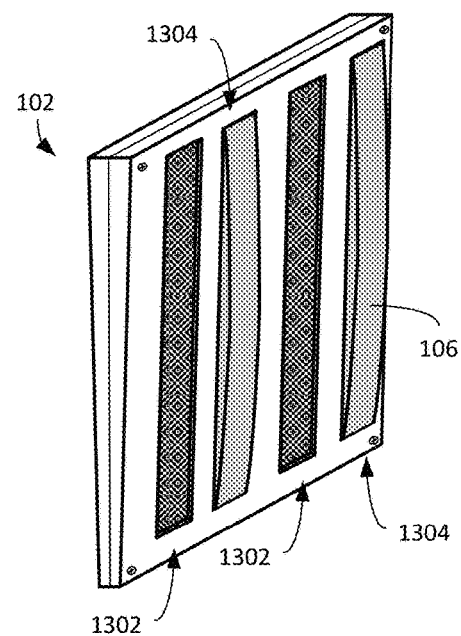
Figure 13C:
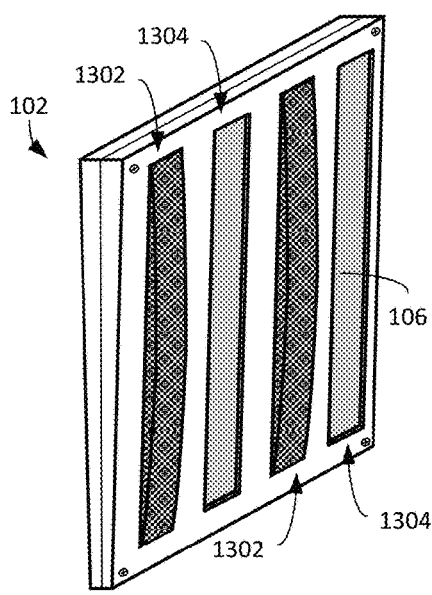

As shown in FIGS. 13A-13C, in some examples, the manipulator 102 can comprise multiple grippers 106 with separate actuation—e.g., using separate eccentrics 704 or supply lines 406 for each gripper 106 or group of grippers 106. In other words, in some examples, a first group 1302 of the grippers 106 can comprise grippers 106 with a first type of surface, for example, while a second group 1304 of grippers 106 can comprise grippers 106 with a second type of surface. In this manner, the grippers 106 can enable the manipulator 102 to securely handle target items 204 with varied surfaces.

As shown in FIG. 13B, the first group 1302 of grippers 106 can be activated for a target item 204 with a first type of packaging, for example, while, as shown in FIG. 13C, the second group 1304 of grippers 106 can be activated for a target item 204 with a second type of packaging. The first group 1302 can comprise grippers 106 with micro needles 1004 to enable the manipulator 102 to securely handle, for example, cardboard boxes and soft items. The second group 1304, on the other hand, can comprise a smooth rubber surface or micro suction cups 1002, for example, to enable the manipulator 102 to securely handle smooth surfaces such as, for example, plastic packaging for painted surfaces. Of course, the grippers 106 can be configured differently to tailor them for use with different target items 204. Indeed, the manipulators 102 can be configured with even more groups 1302, 1304 to provide additional flexibility.

In some examples, regardless of configuration, the manipulators 102 and/or grippers 106 can also include electromagnets. In this manner, when the manipulators 102 are place around a target item 204 and/or the grippers 106 are moved into the deployed position, the electromagnets can also be energized. In this manner, the additional grip provided by the grippers 106, for example, can be supplemented with magnetic force. Obviously, this feature is most effective on ferromagnetic materials (e.g., steel, iron, etc.); however, most materials have some degree of magnetism.

While several possible examples are disclosed above, examples of the present disclosure are not so limited. For instance, while the system 100, 900 has been disclosed for use in a densely packed warehouse, the system 100, 900 can be used anytime items need to be retrieved from shelves, trays, drawers, or other storage solutions, particularly densely packed storage situations. Thus, the system 100, 900 and method 1100 described herein can be used to load and unload trucks, for example, to restock assembly lines, or in other situations. In addition, while described herein as useful in picking items up in a vertical or horizontal manner, the system 100, 900 can also be used to remove items in other orientations (e.g., to remove items from a lower shelf or from inside a container).

In addition, the location and configuration used for various features of examples of the present disclosure such as, for example, the order of the steps used, the components of the system 100, 900, the location and type of manipulators 102, grippers 106, and other features can be varied according to a particular warehouse, for example, or a particular robot or forklift that requires a slight variation due to, for example, the size or construction of the warehouse, the type of delivery truck used, or the types of items being retrieved. Such changes are intended to be embraced within the scope of this disclosure.

The specific configurations, machines, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system comprising:
a first manipulator comprising:
a first main body comprising a first material, the first main body defining a first cavity; and
a first gripper, comprising a second material, the first gripper having a first retracted position in which the first gripper is disposed at least partly within the first cavity and the first gripper having a first deployed position in which at least a portion of the first gripper is disposed outside of the first cavity;
a second manipulator, disposed opposite the first manipulator, the second manipulator comprising:
a second main body comprising the first material, the second main body defining a second cavity; and
a second gripper, comprising the second material, the second gripper having a second retracted position in which the second gripper is disposed at least partly within the second cavity, and the second gripper having a second deployed position in which at least a portion of the second gripper is disposed outside of the second cavity; and
an actuator detachably coupled to the first manipulator and the second manipulator to move the first manipulator and the second manipulator between a first relative position and a second relative position,
wherein a first distance between the first manipulator and the second manipulator in the first relative position is greater than a second distance between the first manipulator and the second manipulator in the second relative position, and
wherein the first material has a lower coefficient of friction than the second material.

2. The system of claim 1, wherein:
the first cavity includes a hydraulic or pneumatic first reservoir;
the first gripper comprises one or more flexible first bladders to seal the first reservoir; and
the one or more flexible first bladders are configured to inflate and move from the first retracted position to the first deployed position;
the second cavity includes a hydraulic or pneumatic second reservoir;
the second gripper comprises one or more flexible second bladders to seal the second reservoir; and
the one or more second flexible bladders are configured to inflate and move from the second retracted position to the second deployed position.

3. The system of claim 2, wherein:
the first main body comprises a plurality of first slots;
the one or more flexible first bladders are configured to protrude through the plurality of first slots and outside the first main body in the first deployed position;
the second main body comprises a plurality of second slots; and
the one or more flexible second bladders are configured to protrude through the plurality of second slots and outside the second main body in the second deployed position.

4. The system of claim 2, wherein:
a plurality of first micro-features on the one or more flexible first bladders are configured to change orientation in the first deployed position;
the first micro-features are configured such that the orientation in the first deployed position has an increased coefficient of friction between the one or more flexible first bladders and an object;
a plurality of second micro-features on the one or more flexible second bladders are configured to change orientation in the second deployed position; and
the second micro-features are configured such that the orientation in the second deployed position has an increased coefficient of friction between the one or more flexible second bladders and the object.

5. The system of claim 1, wherein:
the first gripper comprises a pleated first bladder;
the pleated first bladder is configured to move from the first retracted position to the first deployed position by extending one or more first pleats on the pleated first bladder;
the second gripper comprises a pleated second bladder; and
the pleated second bladder is configured to move from the second retracted position to the second deployed position by extending one or more second pleats on the pleated second bladder.

6. A system comprising:
a first manipulator comprising:
a first main body comprising a first material and defining a first cavity with a hydraulic or pneumatic first reservoir; and
a first gripper, comprising a second material, the first gripper having a first retracted position in which the first gripper is at least partially disposed within the first cavity and the first gripper having a first deployed position in which at least a portion of the first gripper is disposed outside of the first cavity and extends beyond a surface of the first main body;
a second manipulator, disposed opposite the first manipulator, the second manipulator comprising:
a second main body comprising the first material and defining a second cavity with a hydraulic or pneumatic second reservoir; and
a second gripper, comprising the second material, the second gripper having a second retracted position in which the second gripper is at least partially disposed within the second cavity and the second gripper having a second deployed position in which at least a portion of the second gripper is disposed outside of the second cavity and extends from a surface of the second main body; and
an actuator detachably coupled to the first manipulator and the second manipulator to move the first manipulator and the second manipulator between a first relative position and a second relative position;
wherein a first distance between the first manipulator and the second manipulator in the first relative position is greater than a second distance between the first manipulator and the second manipulator in the second relative position, and
wherein the first material has a lower coefficient of friction than the second material.

7. The system of claim 6, wherein:
at least a portion of the first gripper comprises an anisotropic material that provides a first coefficient of friction between the first gripper and an item in a first direction and a second coefficient of friction between the first gripper and the item in a second direction; and
at least a portion of the second gripper comprises the anisotropic material that provides the first coefficient of friction between the second gripper and the item in the first direction and the second coefficient of friction between the second gripper and the item in the second direction.

8. The system of claim 6, wherein:
at least a portion of the first gripper comprises one or more of first micro needles, first micro pyramids, or first micro suction cups to increase friction between the first gripper and an item; and
at least a portion of the second gripper comprises one or more of second micro needles, second micro pyramids, or second micro suction cups to increase friction between the second gripper and the item.

9. The system of claim 6, wherein:
the first gripper comprises a flexible hydraulic or pneumatic first bladder configured to inflate and move from the first retracted position to the first deployed position; and
the second gripper comprises a flexible hydraulic or pneumatic second bladder configured to inflate and move from the second retracted position to the second deployed position.

10. The system of claim 9, wherein:
the first main body comprises a plurality of first slots;
wherein the flexible first bladder is configured to protrude through the plurality of first slots in the first deployed position;
the second main body comprises a plurality of second slots:
the flexible second bladder is configured to protrude through the plurality of second slots in the second deployed position.

11. The system of claim 9, wherein:
a plurality of first micro-features on the one or more flexible first bladders are configured to change orientation in the first deployed position;
the first micro-features are configured such that the orientation in the first deployed position has an increased coefficient of friction between the one or more flexible first bladders and an object;
a plurality of second micro-features on the one or more flexible second bladders are configured to change orientation in the second deployed position; and
the second micro-features are configured such that the orientation in the second deployed position has an increased coefficient of friction between the one or more flexible second bladders and the object.

12. The system of claim 6, wherein:
the first gripper comprises a shape memory alloy (SMA) first actuator configured to move the first gripper from the first retracted position to the first deployed position in response to the application of an electrical current to the SMA first actuator; and
the second gripper comprises a SMA second actuator configured to move the second gripper from the second retracted position to the second deployed position in response to the application of an electrical current to the SMA second actuator.

13. A system comprising:
a first manipulator comprising:
a first main body comprising a first material and a plurality of slots, the first main body defining a cavity with a hydraulic or pneumatic first reservoir; and
a first gripper, comprising a second material and a first flexible bladder dispose in the first reservoir, the first gripper having a retracted position in which the first gripper is disposed at least partly within the cavity and the first gripper having a deployed position in which at least a portion of the first gripper is disposed outside of the cavity;
wherein the first material has a lower coefficient of friction than the second material;
wherein the first flexible bladder is configured to move from the retracted position to the deployed position in response to an increase in hydraulic or pneumatic pressure in the first reservoir; and
wherein the first flexible bladder is configured to protrude through the plurality of slots and outside the first main body in the deployed position.

14. The system of claim 13, further comprising:
a second manipulator, disposed opposite the first manipulator, the second manipulator comprising:
a second main body comprising the first material and a plurality of slots, the second main body defining a cavity with a hydraulic or pneumatic second reservoir; and
a second gripper, comprising a second material and a second flexible bladder disposed in the second reservoir, the second gripper having a retracted position in which the second gripper is disposed at least partly within the cavity and the second gripper having a deployed position in which at least a portion of the second gripper is disposed outside of the cavity;
wherein the second flexible bladder is configured to move from the retracted position to the deployed position in response to an increase in hydraulic or pneumatic pressure in the second reservoir; and
wherein the second flexible bladder is configured to protrude through the plurality of slots and outside the second main body in the deployed position.

15. The system of claim 14, wherein:
at least a portion of the first gripper comprises an anisotropic material that provides a first coefficient of friction between the first gripper and an item in a first direction and a second coefficient of friction between the first gripper and the item in a second direction; and
at least a portion of the second gripper comprises the anisotropic material that provides the first coefficient of friction between the first gripper and the item in the first direction and the second coefficient of friction between the second gripper and the item in the second direction.

16. The system of claim 14, wherein:
at least a portion of the first gripper comprises one or more of first micro needles, first micro pyramids, or first micro suction cups to increase friction between the first gripper and an item; and
at least a portion of the second gripper comprises one or more of second micro needles, second micro pyramids, or second micro suction cups to increase friction between the second gripper and the item.

17. The system of claim 13, wherein at least a portion of the first gripper comprises an anisotropic material that provides a first coefficient of friction between the first gripper and an item in a first direction and a second coefficient of friction between the first gripper and the item in a second direction.

18. The system of claim 13, wherein at least a portion of the first gripper comprises one or more of micro needles, micro pyramids, or micro suction cups to increase friction between the first gripper and an item.

19. The system of claim 13, further comprising:
a second gripper comprising a third material and a second flexible bladder disposed in the first reservoir, the second gripper having a retracted position in which the second gripper is disposed at least partly within the cavity and the second gripper having a deployed position in which at least a portion of the second gripper is disposed outside of the cavity;
wherein the second material provides a first coefficient of friction between the second gripper and an item; and
wherein the third material provides a second coefficient of friction between the second gripper and the item.

20. The system of claim 13, wherein the first flexible bladder comprises a plurality of micro-features configured to change orientation in the deployed position; and
wherein the change in orientation of the plurality of micro-features increases the coefficient of friction between the first flexible bladder and an object.

* * * * *